United States Patent
Jensen et al.

(10) Patent No.: US 10,736,154 B2
(45) Date of Patent: Aug. 4, 2020

(54) WIRELESS REAL-TIME DATA-LINK SENSOR METHOD AND SYSTEM FOR SMALL UAVS

(71) Applicant: RUMFERT, LLC, Omaha, NE (US)

(72) Inventors: David D. Jensen, Omaha, NE (US); Jill A. Jensen, Omaha, NE (US)

(73) Assignee: RUMFERT, LLC, Omaha, NE (US)

( * ) Notice: Subject to any disclaimer, the term of this patent is extended or adjusted under 35 U.S.C. 154(b) by 95 days.

(21) Appl. No.: 15/995,314

(22) Filed: Jun. 1, 2018

(65) Prior Publication Data

US 2018/0359792 A1 Dec. 13, 2018

Related U.S. Application Data

(63) Continuation-in-part of application No. 15/622,028, filed on Jun. 13, 2017, now Pat. No. 10,401,166.

(51) Int. Cl.
| | |
|---|---|
| H04W 76/10 | (2018.01) |
| G08G 5/00 | (2006.01) |
| G06F 3/14 | (2006.01) |
| G06F 3/0482 | (2013.01) |
| G06F 3/0484 | (2013.01) |

(Continued)

(52) U.S. Cl.
CPC ............ *H04W 76/10* (2018.02); *B64D 43/00* (2013.01); *G06F 3/0482* (2013.01); *G06F 3/04847* (2013.01); *G06F 3/1454* (2013.01); *G08G 5/0013* (2013.01); *G08G 5/0026* (2013.01); *G08G 5/0069* (2013.01); *B64C 39/024* (2013.01); *B64C 2201/146* (2013.01); *G06F 3/147* (2013.01); *G08C 2201/00* (2013.01); *G09G 2370/02* (2013.01); *G09G 2380/12* (2013.01); *H04W 4/38* (2018.02);

(Continued)

(58) Field of Classification Search
CPC ....................................................... H04W 76/10
See application file for complete search history.

(56) References Cited

U.S. PATENT DOCUMENTS

| | | | |
|---|---|---|---|
| 8,903,568 B1 | 12/2014 | Wang et al. | |
| 8,924,069 B1 * | 12/2014 | Kaneshige | G05D 1/12 701/27 |

(Continued)

OTHER PUBLICATIONS

Bluetooth Open Altimeter—Web site: http://www.bluetoothopenaltimeter.com/.

(Continued)

*Primary Examiner* — Alex C Dunn

(57) ABSTRACT

Wireless systems and methods are disclosed for establishing a continuous real-time data link communicating flight data of a small UAV to a first smart device over a wireless network. An airborne wireless sensor system is adapted to be removably attached to the UAV. The airborne wireless sensor system has a sensor module for sensing UAV flight data, a communication module for establishing the wireless data-link network and transmitting the sensed UAV flight data the smart device. The smart device may have a software application which permits the user to define data formats for display which may them be communicated to the airborne sensor system to use in building the data pages transmitted to the smart device. Smart devices such as smart phones, smart watches, tablet computers and the like are contemplated to be used.

20 Claims, 11 Drawing Sheets

(51) Int. Cl.

| | | |
|---|---|---|
| *B64D 43/00* | (2006.01) | |
| *H04W 84/18* | (2009.01) | |
| *H04W 4/80* | (2018.01) | |
| *H04W 84/12* | (2009.01) | |
| *H04W 4/38* | (2018.01) | |
| *H04W 4/40* | (2018.01) | |
| *G06F 3/147* | (2006.01) | |
| *B64C 39/02* | (2006.01) | |

(52) U.S. Cl.
CPC ............... *H04W 4/40* (2018.02); *H04W 4/80* (2018.02); *H04W 84/12* (2013.01); *H04W 84/18* (2013.01)

(56) References Cited

U.S. PATENT DOCUMENTS

| | | | | |
|---|---|---|---|---|
| 9,008,869 | B2 | 4/2015 | Allen et al. | |
| 9,028,312 | B1* | 5/2015 | Wei | A63F 13/02 463/2 |
| 9,545,995 | B1* | 1/2017 | Chau | B64C 39/024 |
| 9,588,516 | B1* | 3/2017 | Gurel | G05D 1/0033 |
| 9,650,155 | B2 | 5/2017 | Wang et al. | |
| 9,652,904 | B2 | 5/2017 | Shi et al. | |
| 9,663,227 | B1 | 5/2017 | Lema et al. | |
| 9,696,725 | B2* | 7/2017 | Wang | G05D 1/0669 |
| 10,114,756 | B2 | 10/2018 | Koob et al. | |
| 2006/0138277 | A1* | 6/2006 | Franceschini | G05D 1/0646 244/17.13 |
| 2007/0244608 | A1* | 10/2007 | Rath | G05D 1/0038 701/3 |
| 2014/0297067 | A1* | 10/2014 | Malay | G01C 9/005 701/4 |
| 2014/0316616 | A1* | 10/2014 | Kugelmass | G05D 1/101 701/8 |
| 2015/0379874 | A1* | 12/2015 | Ubhi | G01S 5/0027 701/3 |
| 2016/0117853 | A1* | 4/2016 | Zhong | B64C 39/024 345/634 |
| 2016/0214715 | A1* | 7/2016 | Meffert | B64C 39/024 |
| 2016/0363447 | A1* | 12/2016 | Hayes | G08G 5/0013 |
| 2017/0127245 | A1 | 5/2017 | Adkins | |
| 2017/0285627 | A1* | 10/2017 | Feldmann | H04B 7/1851 |
| 2018/0046062 | A1* | 2/2018 | Fisher | G08C 17/02 |
| 2018/0046187 | A1* | 2/2018 | Martirosyan | G05D 1/0094 |
| 2018/0120829 | A1* | 5/2018 | Price | G05D 1/0022 |
| 2018/0162527 | A1* | 6/2018 | Hupp | B64D 7/04 |
| 2018/0173247 | A1* | 6/2018 | Ratti | B64D 47/08 |
| 2018/0218214 | A1* | 8/2018 | Pestun | G06K 9/0063 |
| 2018/0225230 | A1* | 8/2018 | Litichever | G06F 21/56 |
| 2018/0260626 | A1* | 9/2018 | Pestun | G06K 9/00637 |
| 2018/0275654 | A1* | 9/2018 | Merz | G01S 13/9303 |
| 2019/0172357 | A1 | 6/2019 | Meuleman et al. | |
| 2019/0204824 | A1* | 7/2019 | Micros | B64C 39/024 |

OTHER PUBLICATIONS

Bluetooth Open Altimeter—User's Guide.
Open Altimeter—Website (Home page) http://openaltimeter.org/index.html.
Open Altimeter—Website (Hardware page) http://openaltimeter.org/hardware.html.
Open Altimeter—Website (Instructions page) http://openaltimeter.org/instructions.html.
Spektrum SPMA9575 Aircraft Telemetry Altimeter—Web page https://www.spektrumrc.com/Products/Default.aspx?ProdID=SPMA9575.
Spektrum AR9320T Telemetry RX—Web page https://www.spektrumrc.com/Products/Default.aspx?ProdID=SPMAR9320T.
Spektrum SPMA9589 Aircraft Telemetry Variometer Sensor—Web page https://www.spektrumrc.com/Products/Default.aspx?ProdID=SPMA9589.
Uavionix Corporation, Concepts for Remote Identification, Mar. 22, 2017, p. 11, sctn 5.7 Airborne Component; https://uavionix.com/downloads/whitepapers/uavionix-remote-identification-white-paper.pdf.
Eagle Tree Systems, LLC—Altimeter MicroSensor V4 Company product web site: http://www.eagletreesystems.com/index.php?route=product/product&path=64&product_id=60 Product manual: http://www.eagletreesystems.com/Manuals/altimeter-v4.pdf.
Parrot—Navigation board https://www.dollarhobbyz.com/products/parrot-ar-drone-2-0-quadcopter-navigation-board?variant=10907414401&gclid=COO7s_e2mNMCFdK6wAodZ0QKVw.
Hobby King Altimeter Bluetooth Adapter Company web site: https://hobbyking.com/en_us/hobbykingr-tm-altimeter-bluetooth-adapter-for-wireless-android-app.html?_store=en_us Manual site: https://hobbyking.com/media/file/720875413X365809X2.pdf.
Jolly Logic products—Altimeter one, Altimeter two, Altimeter three Company site: https://www.jollylogic.com/ Altimeter One site: https://www.jollylogic.com/products/altimeterone/ Altimeter Two site: https://www.jollylogic.com/products/altimetertwo/ Altimeter Three site: https://www.jollylogic.com/products/altimeterthree/.
Leddar Tech product—Leddar One (optical IR sensor) Company site: http://leddartech.com/ Product site: http://leddartech.com/modules/leddarone/.
Estes—Model Rocket Altimeter Company site:http://www.estesrockets.com/ Product site: http://www.estesrockets.com/rockets/accessories/002246-estesr-altimeter.
Hobbyist altimeter: http://hackaday.com/2014/06/20/the-ultimate-tiny-altimeter/?utm_source=feedburner&utm_medium=feed&utm_campaign=Feed%3A+hackaday%2FLgoM+%28Hack+a+Day%29.
DJI—Drones with integrated navigation boards & altimeter function Company site: http://www.dji.com/ Product manual: https://dl.djicdn.com/downloads/phantom_4/20170327/Phantom+4+User+Manual+v1.4.pdf.
Public Missiles Ltd Co-pilot V3 Altimeter Web site: https://publicmissiles.com/product/electronics Manual: https://publicmissiles.com/secure/images/CoPilot3InstructionsVer1_3.pdf.
PerfectFlite altimeters: http://www.perfectflite.com/Firefly.html FireFly: http://www.perfectflite.com/Firefly.html StratoLoggerCF: http://www.perfectflite.com/SLCF.html StratoLogger SL 100: http://www.perfectflite.com/sl100.html Pnut: http://www.perfectflite.com/pnut.hmtl.
Marsa Systems Marsa54 http://www.marsasystems.com/index.php/products/marsa54lhd.
Missle Works RRC3 http://www.missileworks.com/rrc3/ User manual http://www.missileworks.com/app/download/965482691/RRC3+User+Manual+v1.60.pdf.
Eagle Tree Systems, LLC Seagull Wireless Dashboard Flight System Web site: http://www.eagletreesystems.com/index.php?route=product/product&path=63_70&product_id=90 Manual: http://www.eagletreesystems.com/Manuals/Pro,%20Glide,%20Flight%20and%20Boat%20Seagull%20and%20Data%20Recorder%20Instruction%20Manual.pdf.
Unpublished U.S. Appl. No. 15/905,340, "Direct-Broadcast Remote Identification (RID) Device for Unmanned Aircraft Systems (UAS)"; applicant: Uavionix Corporation; filed Feb. 26, 2018.

* cited by examiner

WIRELESS REAL-TIME DATA-LINK SENSOR METHOD AND SYSTEM FOR SMALL UAVS

CROSS REFERENCE TO RELATED APPLICATIONS

This application is a continuation-in-part of U.S. patent application Ser. No. 15/622,028 filed Jun. 13, 2017, which is incorporated herein by reference in its entirety.

TECHNICAL FIELD

The subject matter of the invention relates generally to recreational Unmanned Aerial Vehicles (UAVs) and more particularly to the determination and remote real-time display of sensor data for small recreational UAVs using wireless data-link techniques.

BACKGROUND OF THE INVENTION

Unmanned Aerial Vehicles (UAVs) have been around for many years. Remotely controlled aircraft have been in use by both the military as well as civilian hobbyists for years. Many of these were of the traditional 'fixed wing' design, e.g. radio controlled (RC) model aircraft. More recently, small rotary wing craft, particularly multi-rotor craft (e.g. 'quad copters') have become popular in part due to their ease of operation and price point. This latter variant of UAV is commonly referred to as 'drones' although the class known as UAV properly defines a much larger variety of vehicles.

These UAVs or drones come in a wide variety of sizes and sophistication ranging from professional and military UAVs with navigation guidance and control systems, some as sophisticated as any manned aircraft and powered by turbine engines, to moderately sophisticated UAVs for limited commercial purposes, to small personal or recreational vehicles used primarily by hobbyists. The applicability of the present invention is to this latter category of vehicles. As applied to the present invention, the term UAV is intended to cover not only the hobbyist drones but also RC model aircraft, model rockets and even kites.

Recreational drones have captured the interest and imagination of the general public much in the same way as earlier generations were captivated by the introductions of remote controlled (RC) model aircraft and model rocketry during the space race. The speed with which these small recreational drones were introduced into the public domain exceeded the speed with which the US aviation regulators could promulgate regulations. That has begun to change and the Federal Aviation Administration (FAA) has recently issued rules governing UAV operations in the United States. Similarly the European Aviation Safety Agency (EASA) has begun issuing rules for UAV operation in Europe. It is of the utmost importance for recreational operators to follow these rules for both the safety of the public and their own wellbeing not to mention the long term viability of the hobby (one serious incident could well bring a halt to the hobby).

One of the most important factors in flying safely is the maintenance of a safe altitude. This is just as true with UAVs as it is with manned aircraft. Thus it is no surprise that one of the first regulations implemented by the FAA in connection with civil UAVs was regarding altitude.

By FAA regulation, drone operators must keep the flying vehicle less than 400 feet above ground level (AGL) (14 CFR .sctn. 107.51(b)). There is also a requirement that UAV operators (FAA.sctn. 107 refers to them as 'remote pilots') must maintain the UAV within visual line of sight (VLOS). Depending on the size of the UAV, maintaining VLOS of the UAV might be a more restrictive requirement than the AGL altitude requirement. Nonetheless, it is good situational awareness for the remote pilot to know the UAV altitude at all times. Also, there are often non-regulatory reasons why knowledge of the vehicle's current altitude is desired such as when doing photography or remote sensing operations and of course there is always just curiosity, 'I wonder how high that thing is?' Notwithstanding this need for constant vigilance of the UAV's altitude, there is currently a lack of availability in the market for an apparatus and method of measuring and monitoring the altitude of smaller UAVs. As understood in the art, 'small' UAV is meant to be a UAV weighing less than 55 lbs (14 CFR 107.3).

As mentioned, professional UAVs have sophisticated navigational and guidance systems which constantly measure and report altitude to a remote pilot, sometimes thousands of miles away. Additionally, many of the larger and more expensive recreational drones have an altitude monitoring capability built in as part of the drone's overall navigation and guidance and control module. Since the sensors and other components are integral to these UAV navigation systems, these altitude monitoring systems cannot be adapted for use on other smaller UAVs which do not come equipped with such capabilities. Furthermore, since the altitude sensor is only one component of a larger integrated navigation system, it would not be physically or functionally possible to place it on another UAV.

At the smaller end of the spectrum, UAV hand controllers (FAA term 'control station') generally do not include any altitude or other navigation monitoring function, they are strictly designed to provide flight control of the propeller motors and perhaps a small on-board camera. Nonetheless, these smaller drones are still subject to the same altitude regulations as their larger and more expensive brethren. Thus there is a need in the market to provide a real-time apparatus and method of monitoring the altitude of these smaller UAVs. Furthermore, an apparatus which can be removably attached to the UAV facilitates its use on several different models. Since hobbyists are known to frequently collect a stable of models, this allows the cost of the unit to be spread over an ever increasing heard.

Current aftermarket stand-alone devices which measure altitude for smaller UAVs do not provide a real-time, remote indication of altitude. For example, prior devices had been devised which capture altitude during flight but preserve only the highest value. Other devices which acquire a continuous report of altitude, do not transmit the data back to the UAV pilot in real-time but rather require a post flight visual inspection of the sensor or a download of its data. Thus, a remote pilot would know he violated altitude limits only after the UAV was on the ground and the post flight analysis had occurred, hardly useful for compliance. Furthermore, many of these devices utilize raw mean sea level (MSL) altitude data from the sensor uncorrected for local pressure setting. Thus conversion to the FAA's above ground level (AGL) altitude frame of reference requires both a correction for flight-time local pressure as well as knowledge of the operating location's MSL elevation. (As is well understood by those in the art, above ground level (AGL) altitude refers the height above the ground over which the vehicle is currently flying, mean sea level altitude (MSL) refers to the height of the vehicle above the mean sea level of the earth. AGL altitude may be computed by subtracting the elevation of ground level from the measured MSL vehicle altitude.) Thus continuous mental computation would be required to obtain a value useful to the pilot. Clearly these limitations are unacceptable when it comes to regulatory compliance and safety. To maintain safe situational awareness, the UAV AGL altitude must be known continuously and in real-time as the flight is underway.

Thus, what is needed is a small, stand-alone altitude monitoring system which can continuously transmit a small UAV's altitude and/or other flight data back to the remote pilot on the ground giving him/her a real-time indication of the UAVs altitude and/or other flight data and in the case of altitude data, preferably in AGL terms. The design of such a system would allow it to be easily removed and reattached to different UAVs. An additional goal is to have the airborne sensor system work with existing portable smart devices such as smartphones, smartwatches, tablet computers and the like.

In the context of this disclosure, 'real-time' shall mean that acquisition, processing, transmission, reception and display of the UAV altitude and/or other flight data, should occur with minimal perceptible delay between data acquisition and its display to the remote pilot. Further in the context of this disclosure, 'stand-alone' shall refer to a system which is not integrated physically or electronically into the original UAV system but rather something that is physically independent of the UAV airframe and hand controller and associated circuitry, which is capable of being operated independently of the UAV and which most likely is obtained in the aftermarket. 'Removably attachable' shall refer to a system which may be readily attached and detached from the UAV. Some examples of attachment means in this context would be using Velcro®, straps, clips, Scotch® mounting putty or restickable strips, Glue Dots®, ties, rubber bands, even tape or the like to name just a few, and would preclude attachments wherein the sensor is integrated into other UAV electronics. 'Remote' shall refer to the non-negligible physical distance between the UAV and the UAV pilot ('remote pilot') and/or the distance between the altitude sensor/UAV and the receiver/display ('remote receiver/display'). For the purposes of this disclosure, the terms 'sensed' or 'measured' will refer to the data provided directly from the sensor while the terms 'computed' or 'converted' shall refer to the data resulting from some mathematical processing of the 'sensed' or 'measured' sensor value. One such example is that where the measured MSL altitude is converted to AGL altitude by application of a conversion factor. In an exemplary embodiment, this conversion factor is an altitude bias which is applied to the measured MSL altitude. In one example, this value is referred to as 'zero_AGL_altitude_bias' which is subtracted from the measured value. Determination of the 'zero_AGL_altitude_bias' is described below in detail.

SUMMARY OF THE INVENTION

The invention provides an airborne wireless sensor system (AWSS) removably attached to a UAV. Also within the scope of this invention is a method for displaying the sensed UAV data on a portable smart device. Furthermore, the scope includes a process for the acquisition, transmission and display of flight and situational data such as altitude, position, or environmental parameters via one or more wireless networks. In exemplary embodiments the wireless network may utilize the Wi-Fi (IEEE 802.11), Bluetooth (IEEE 802.15.1), Zigbee (IEEE 802.15.4), ISM protocols and the like. The invention may include computer code/software instructions executable on the AWSS and/or smart device for accomplishing the invention processes.

In an exemplary embodiment, the Airborne Wireless Sensor System comprises one or more sensor modules for acquiring various flight data such as altitude, position, environmental data, video or the like associated with the UAV. The airborne sensing system also comprises a first processor module coupled to the sensor module and operative to receive the sensed data output by the sensor module. The airborne sensing system further comprises an wireless communication module coupled to the first processor module for transmitting UAV sensed data to a remote receiver over a wireless network. The means for coupling the sensor, processor and communication modules may be any one of the numerous standard interfacing protocols such as I2C, SPI, serial and the like, the choice being dictated generally by the particular integrated circuit or component used to realize the module.

The first processor module may further comprise a memory and other necessary subcomponents for storing various initialization parameters and storage and processing of various flight parameter values. Additionally, the first processor module memory may comprise a non-volatile memory for storing computer instructions or code executable by the first processor which when executed, causes the airborne sensor system to perform the flight data sensing and transmit functions described herein. Such code may be referred to as the 'flight code' to identify it as the code associated with the airborne system. In an exemplary embodiment, the flight code is loaded into the AWSS processor memory in the factory prior to shipment. The airborne sensor system may also have an independent source of power such as a battery to electrically power airborne sensor system components. In an exemplary embodiment, the processor and transmitter modules may be integrated into a single system on a chip (SOC) component.

As used herein, the term 'coupled' shall mean that two elements are electrically connected to each other such that they are in communication with each other in the sense that data, control signals or power is communicated between them.

In a further exemplary embodiment of the present invention, a smart device may be used for receiving and displaying the transmitted UAV flight data in real-time. The smart device may comprise a non-volatile memory for storing instructions or code (aka 'app'), a processor system for executing those instructions, a display for displaying information to the operator, and input means for receiving input from the operator and a communications module operative to facilitate wireless communication between the smart device and a wireless network. Examples of such smart devices include but are not limited to tablet computers, laptops, personal data assistants, smartphones, smartwatches and the like. An alternative is a dedicated stand-alone receiver/display capable of receiving and displaying the transmitted data.

In one example, a software application ('app') might be utilized by the smart device to facilitate the reception and display the transmitted data. The code may be stored in the smart device non-volatile memory and executable by the smart device processor. Such code will be referred to as the 'app code' to identify it as the code associated with the ground based smart device and to distinguish it from code operating in the airborne system. The code might control functions such as controlling wireless communication receiving and processing user input, receiving data of the network and displaying data to the user. In an exemplary embodiment, the app might be made available for download through one of the common 'app' stores such as Google Play, Apple App Store, Windows Apps Store and Amazon Appstore to name a few.

In an exemplary operational scenario, the AWSS is removably attached to the UAV and the smart device is located on or near the pilot flying the UAV such that the display is in visual proximity to the pilot. The airborne system and smart device are independently switched on and/or activated prior to flight. The airborne system and smart device may have initialization sequences that run automatically upon power-up. The initialization sequence of the AWSS may include an initialization altitude calibration and the initialization of the smart device may include an invitation to select display data formats and connection to the wireless network.

After initialization, the flight of the UAV may then commence whereupon altitude and/or other sensor data from the altitude sensing unit are periodically transmitted or made available to the smart device. Depending on wireless protocol, data may be transmitted in the blind (w/o specific request) or it may be delivered on demand such as when a client requests a page. Upon receipt of the transmitted data, the data is displayed on the smart device. The display data format may be one of a plurality of default formats or may be one of the operator selected display data formats.

In the context of this disclosure, 'real-time' shall mean that acquisition, processing, transmission, reception and display of the UAV flight data occurs with minimal perceptible delay between data acquisition and its display to the remote pilot. Further in the context of this disclosure, 'stand-alone' shall refer to a system which is not integrated physically or electronically into the original UAV system but rather something that is physically independent of the UAV airframe and which is capable of being operated independently of the UAV. 'Removably attachable' shall refer to a system which may be readily attached and detached from the UAV. 'Remote' shall refer to the non-negligible physical distance between the UAV and the UAV pilot ('remote pilot') and/or the distance between the altitude sensor/UAV and the receiver/display ('remote receiver/display'). As applied to the present invention, the term UAV is intended to cover not only the hobbyist drones but also RC model aircraft, model rockets and even kites.

DETAILED DESCRIPTION

Figure 1:
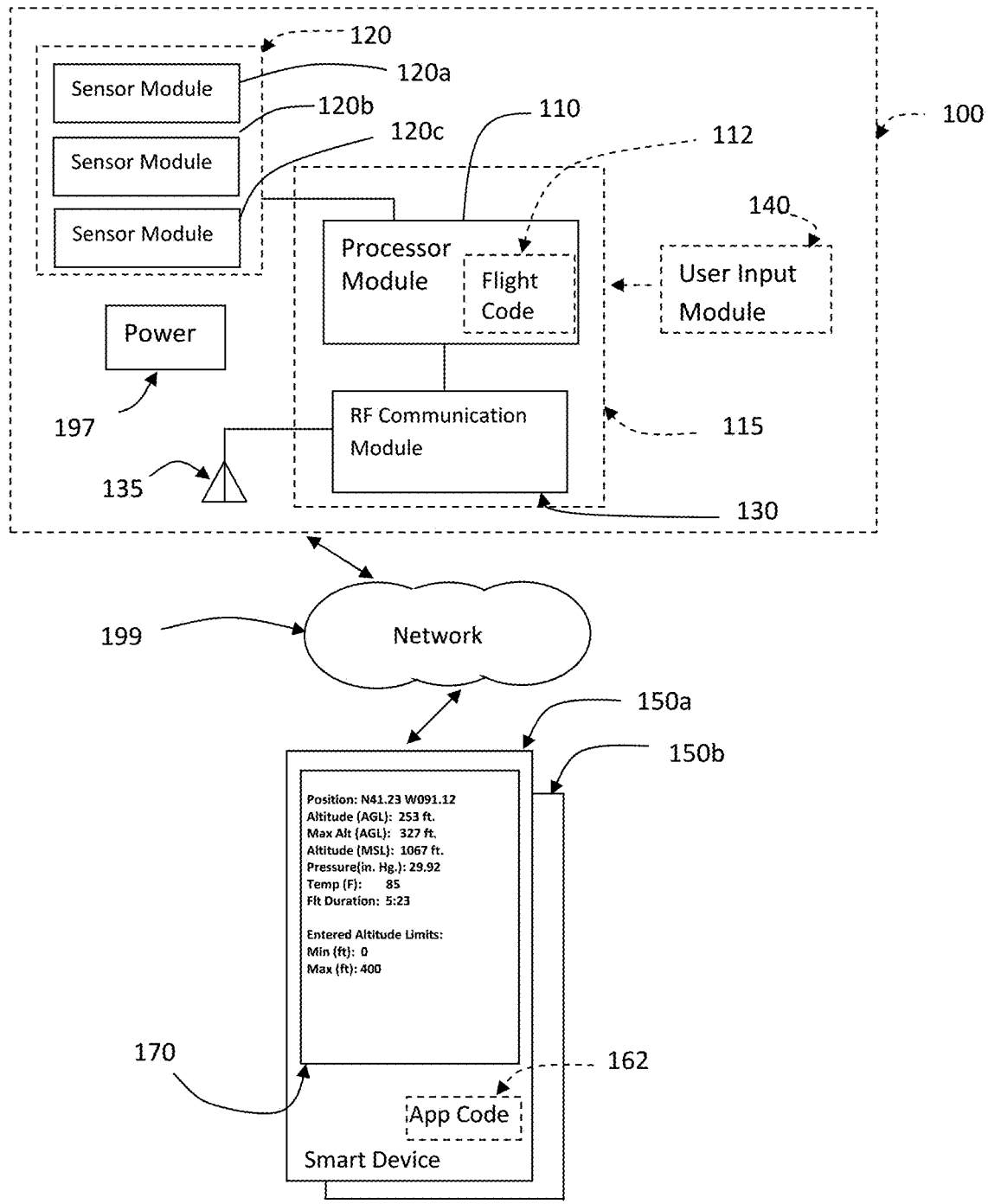
FIG. 1 is a block diagram illustrating major components of the system and method of the invention.

FIG. 1 illustrates in block diagram form, an exemplary embodiment of the present invention. As seen generally, the invention comprises an Airborne Wireless Sensor System (AWSS) 100 wirelessly connected to one or more 'smart' devices 150a, 150b through wireless network 199. As may be deduced from its name, the AWSS 100 is the portion of the system which flies with the UAV whereas the smart device 150 remains on or near the ground and generally within visual range of the UAV pilot or another visual observer.

AWSS 100 generally represents the hardware, circuitry, and processing logic necessary to sense UAV altitude and/or other data, process the data and transmit the data to the 'smart' device 150 over wireless network 199. In a basic configuration, the AWSS 100 may comprise one or more sensor modules 120a, 120b, 120c for sensing flight data, a communications module 130 for connecting to the wireless network 199 and a power module 197 for supplying power to the AWSS 100. A client interface 140 might also be provided in some embodiments. As seen by the dotted lines in the figure, one or more of the components may be combined into physically integrated components. For example one or more sensor modules might be combined into a sensor suite 120 resulting in a sensor capable of sensing a plurality of data parameters. As another example, the processor 110 and communication module 130 may be combined into a single integrated component such as a System on a Chip (SoC). The AWSS 100 may also comprise nonvolatile memory. The non-volatile memory could be a discrete module in the AWSS or it could be integrated into the processor module 110. The non-volatile memory may store initialization parameters, flight data or the like. The memory may also store computer code or instructions 112. These instructions would be executable by the processor 110 which when executed enable the AWSS to perform its intended functions of sensing flight data, processing the data and providing the data on the wireless network 199.

In an exemplary embodiment, the AWSS 100 is designed to be a stand-alone device, i.e. not physically or electrically integrated with any of the UAV structures or components. It is designed to be removably attached to a UAV such that it is carried aloft when the UAV is launched but also able to be easily moved from one UAV to another.

Wireless network 199 is the medium through which information is communicated by the AWSS 100 to the smart device 150 and also from the smart device 150 to the AWSS. Wireless network 199 may be any one of a plethora of various network types such as LAN, WAN, PAN, VPN, utilizing ISM, IEEE 802.11 (Wi-Fi), IEEE 802.15.1 (Bluetooth), IEEE 802.15.4 (Zigbee) protocols and the like to name just a few. In one preferred or exemplary embodiment, the AWSS 100 functions as a wireless access point connecting to one or more client devices 150a and 150b thru a Wi-Fi network. In another exemplary embodiment a plurality of client devices may be utilized with the AWSS 100 functioning as a wireless access point connecting to a first client device 150a thru a Wi-Fi network and to a second client device 150b using a Bluetooth network. In yet another embodiment, a data relay arraignment may be employed whereby the AWSS may connect to a first device over Wi-Fi and the first device may connect to a second device over Bluetooth. Many alternative combinations are possible.

Smart device 150 is the ground based device maintained in visual proximity to the UAV pilot or other observer such that a close visual inspection of the UAV altitude and/or other data displayed thereon may be maintained. Smart device 150 may be realized as a commercial off the shelf device having a communication module for receiving a wireless data signal transmitted by the AWSS 100, a processor, and a display means 170 for displaying the received data to the user and also for receiving operator input, such as a touch screen display. Some examples of such off the shelf smart devices, by no means exhaustive, are laptops, tablet computers, PDAs, smartphones and smartwatches. It is also envisioned that the smart device 150 would have a non-volatile memory into which software code or instructions 162 could be loaded for execution by the smart device processor. Execution of the code 162 by the smart device processor would enable performance of the smart device functions enumerated throughout this disclosure. It is envisioned that the collection and transmission of the UAV flight data by the AWSS 100 and the reception and display of the data on the smart device 150 occurs in real-time.

Turning again to FIG. 1, in an exemplary embodiment, the AWSS 100 is comprised of three major modules, the processor module 110, one or more sensor modules 120 and the communication module 130, in addition to supporting modules user input module 140 and power module 197.

The sensor module(s) 120 represent the hardware, circuitry and processing necessary to measure UAV altitude and/or other data and interface with other system components. Choice of sensor depends of course on what data is being measured or acquired. For example for measuring altitude, sensors include but not limited to acoustic sensors, RADAR sensors, LIDAR sensors, GPS, and barometric pressure sensors. Some are direct measures of altitude while others implicitly measure altitude. Some are more accurate than others and some would be far too heavy and expensive for the intended application. In an exemplary embodiment, the altitude sensor is realized as a barometric pressure sensor for altitude determination.

In an exemplary embodiment, the sensor module 120 includes an altitude sensor for measuring UAV altitude, temperature & pressure. Several varieties of pressure sensors are available on the market. Some specific manufacturers of pressure sensors are Bosch (BMP series), TE Connectivity (MS560702 series), NXP USA (MPL series), Amphenol (NPP-301 series), Honeywell (NBPLPNN series), STMicroelectronics (LPS series), EPCOS (TDK) (B58600 series) to name but a few.

In some exemplary embodiments, sensor module 120 may be an altitude sensor realized with the MPL3115A2 pressure sensor. This sensor utilizes an I²C (inter-integrated circuit) interface. It also has a small physical and power footprint. It has a variety of output modes which can be selected. One of the modes provides direct altitude (MSL) readout. Additionally outputs of temperature and pressure are available.

In another example, sensor module 120 may be realized with the BMP 280 series pressure sensor. It utilizes either an SPI (Serial Peripheral Interface) or I²C interface and has a nominal power consumption of 2.7 µA (peak of 720 µA during a pressure measurement). A 'sleep' mode (i=0.1 µA) is provided for extremely low consumption during non-measurement cycles. Its extremely small size and light weight make it useful for the present use environment. It outputs measurements of temperature and pressure. There is no direct readout of altitude so this computation must be done in the processor module 110.

While the above discussion has focused on the measurement of UAV altitude, other flight data may be determined using other sensors. In one embodiment, one of the sensor modules may comprise a GPS module 145 coupled to the processor module 110 for determining various flight information such as speed, position (including altitude), and accelerations.

Still another example of a sensor contemplated by the present invention is a video or image sensor. Such a video or image sensor might operate in the visual spectrum or in another wavelength such as infrared depending on operational requirements. Such sensors are offered in numerous resolutions, size, image quality, output formats and interface protocols, etc.

Most of the sensors discussed here utilize a standard interface such as SPI, I²C, USB, RS232 and the like. The SPI and I²C interfaces in particular are very common on small microprocessor systems and are frequently used in System on a Chip (SoC) designs. Thus, most of these sensors are easy to integrate with a minimum of components. Additionally many of the sensors descried have a 'sleep mode' which allows them to be put into a power conserving mode. Regardless of which sensor(s) is used, it (they) would be coupled to the processor module 110 for any necessary processing and to provide the sensed/processed data to the communication module 130 to be made available on the wireless network 199.

The wireless communications module 130 represents the hardware, circuitry, and processing necessary to receive commands and to receive and transmit data on the wireless network 199. It receives command instructions and the flight data from the processor module 110 and effectuates the transmitting of the data from the AWSS 100 onto the wireless network 199. Wireless communication module 130 may also comprise the necessary circuitry and functionality to receive requests from the network 199 and convey the requests to processor module 110.

Within the RF class, there are many families or standards of wireless transmission. For example, Wi-Fi (IEEE 802.11), Bluetooth (IEEE 802.15.1), Zigbee (IEEE 802.15.4), cellular, ISM, WPAN, cellular etc to name just a few. Other variables to be chosen, depending on the protocol, may be frequency, modulation type, power output, encryption etc. wireless transmitters and receivers can be constructed from discrete components or are contained in integrated modules. Some manufacturers of wireless transmitters and receivers include Infineon Technologies, Semtech, Microchip Technologies, Melexis, RF Solutions, Maxim Integrated and HOPERF to name just a few. Additionally, some manufacturers provide an integrated processor/communication function in a SoC configuration. Some exemplary implementations are the ESP32 and 8266 families by Expressif, DF Robot and Seed Technology's RTL8710. It is a popular development space especially in the area of integrated Wi-Fi and Bluetooth modules. Utilization of a SoC design is an extremely attractive option as it reduces part count and physical footprint. Additionally, many times the integrated component may have achieved FCC certification. Communication modules 130 adapted to connect to wireless networks are sometimes referred to as 'wireless network interface controllers.' Many networks connect to the internet through a server or wireless router. However, others define a closed or local area network known as a 'wireless local area network' or WLAN for Wi-Fi based networks or 'wireless personal area network' or WPAN for Bluetooth based networks. In some of these local networks devices may connect directly to each other without an intermediary device such as a server. These networks are sometimes referred to in the art as wireless 'ad-hoc' networks (WANET) or Wi-Fi direct networks. In one exemplary embodiment, wireless network 199 comprises a wireless ad-hoc network.

In one exemplary embodiment, the AWSS 100 may be configured as a wireless access point (WAP) with the smart device 150 operating as a client. However instead of the usual WAP which may provide wired access to a public network such as the internet, the AWSS 100 establishes its own private Wireless Local Area Network (WLAN). This is also sometimes referred to as an 'ad-hoc' network with peer to peer (P2P) communication. In this embodiment, and by principles well understood by those in the art, the AWSS 100 acts as a 'server' serving up data and/or 'pages' to connected client devices upon request of the client. In this embodiment, client smart device 150 may periodically send requests to which the AWSS 100 may respond with 'web pages' to be built on the smart device 150. The form and content of such 'page' is near limitless being determined primarily by the data being sensed and any operator preferences. As described elsewhere, the operator may be given the ability to select display options which would drive the building of the pages being served. In one exemplary embodiment, the Hypertext Transfer Protocol (http) protocol is used.

Regardless of the communication module realization, transmission will generally require an antenna. In FIG. 1 it is seen that the communication module 130 is connected to an antenna 135 for broadcast of the flight data to the smart device 150. In some embodiments, this is a simple ¼ wave wire which can be placed anywhere so as not to interfere with flight operations. Alternatively, and in an exemplary embodiment, the antenna may comprise traces on a printed circuit board (PCB). Several of the manufacturers of the SoC Wi-Fi modules referenced above provide PCB trace antennas as part of their design. Such antennas are generally suitable for the ranges involved but may be supplemented or replaced by external antennas if needed.

In some embodiments, the AWSS 100 may also include a user input interface module 140 coupled to processing module 110. The operator/user interface module 140 would be a means of setting configuration variables that could be read by the processing module 110. As one example, a data sampling rate input could be provided for setting 'fast' or 'slow' capture rates. The 'slow' rate corresponding to one rate and 'fast' corresponding to something faster. Such a setting would tailor the data capture for different environments such as a quad copter drone or RC model airplane verses a model rocket where a much higher data capture rate might be desirable due to the much greater data rate of change. Another example might be an integration constant filter setting input. As an example, settings of 'hard' or 'soft' might be available allowing the operator/user to choose between longer data integration times or shorter times resulting in more or less smoothing of the data variations. A still further example might be a unit's configuration allowing the altitude data to be given in units of MSL or AGL or feet or meters. A still further example might be the selection of transmit power. In an exemplary embodiment, each of these configuration parameters may have default values 'hard coded' into the instruction set 112 ('flight code') such that no user input is required. As described in more detail below, it is also contemplated that these and/or other selections may be made on the smart device and transmitted wirelessly to the AWSS 100 for implementation. The user input interface 140 may also comprise a power switch controlling application of electrical power to the unit 100.

The processor module 110 generally represents the hardware, circuitry, and processing logic necessary to execute instructions, process data and interface with the other components of AWSS 100 such as the sensor module 120, the communication module 130, and user input interface module 140. Processor module 110 may comprise non-volatile memory for storing instructions 112. These instructions would be executable by the processor 110 and which when executed, enable the AWSS 100 to perform its intended functions of sensing flight data, processing the data and providing the data on the wireless network 199 as well as various other interface and control functions.

Processor module 110 may interface to sensor module 120 to provide initialization commands related to the sensor acquisition of data. The interface to the sensor may also operate to receive sensor data in a manner which may be prescribed by flight code 112 executing in processor module 110. Flight code 112 might be factory preloaded and/or field loadable or field modifiable as is well understood in the art. Examples of sensor data scheduling may be periodic or on demand. Upon reception of sensor data, the processor module may perform certain processing of the data which again may be prescribed by the flight code 112. Examples of such processing might be a computation which results in a sensor value in one reference frame (e.g. MSL) converted to another reference frame (e.g. AGL). Additionally, initialization of the sensor may occur by processor module 110 such as controlling the data communication rate between the sensor and the processor, defining data types output from the sensor and the like. Coupling of the sensor module(s) 120, and processor module 110 may be by standard interfacing protocols such as I2C, SPI, serial or the like. Specific choice will be driven by the components selected for the implementation.

Similarly, an interface may be provided between processor module 110 and communication module 130 wherein the processor module 110 may control initialization of the communication module 130 to perform tasks such as setting communication protocols, communication rates and establishing the wireless network 199. The interface may also provide the means for the processor module 110 to convey flight data to the communication module 130 to service network requests for data. Coupling of the communication modules 130 and processor module 110 may be by standard interfacing protocols such as I2C, SPI, serial or the like. Specific choice will be driven by the ICs selected for the implementation.

As will be appreciated by those skilled in the art, processor module 110 may be any of a number of devices capable of performing such functions, some examples being microprocessors, microcontrollers, Application Specific Integrated Circuits (ASIC), Programmable Logic Array (PLA), Field Programmable Gate Array (FPGA), Processor System on a Chip (PSoC) systems, etc. Major manufacturers include Cypress (MB95x, CY8C), Intel (NG80x), Motorola, Zilog (Z8x), Texas Instruments (AM335x), Atmel/Microchip Technology (ATMega, ATTINY), STMicroelectronics (STM8S) etc. As will be well understood in the art, processor module 110 and communication module 130, though drawn separately in the figure to highlight their functional responsibilities, may in fact be integrated into a single physical System on a Chip (SoC) 115 fabricated component. In an exemplary embodiment, the processor module is part of a System on a Chip (SoC) implementation which integrates both the processing function and the wireless communication function into a single module. Integrated wireless SoCs are provided by manufacturers such as Expressif, Seed Technology, DF Robot, Silicon Labs, to name just a few. In one exemplary embodiment, processor module 110 is realized as an Wi-Fi SoC module. One example of such a SoC is the Expressif ESP8266 based IoT systems. Another example is the ESP32 which includes both Wi-Fi and Bluethooth functionalities.

Figure 2A:
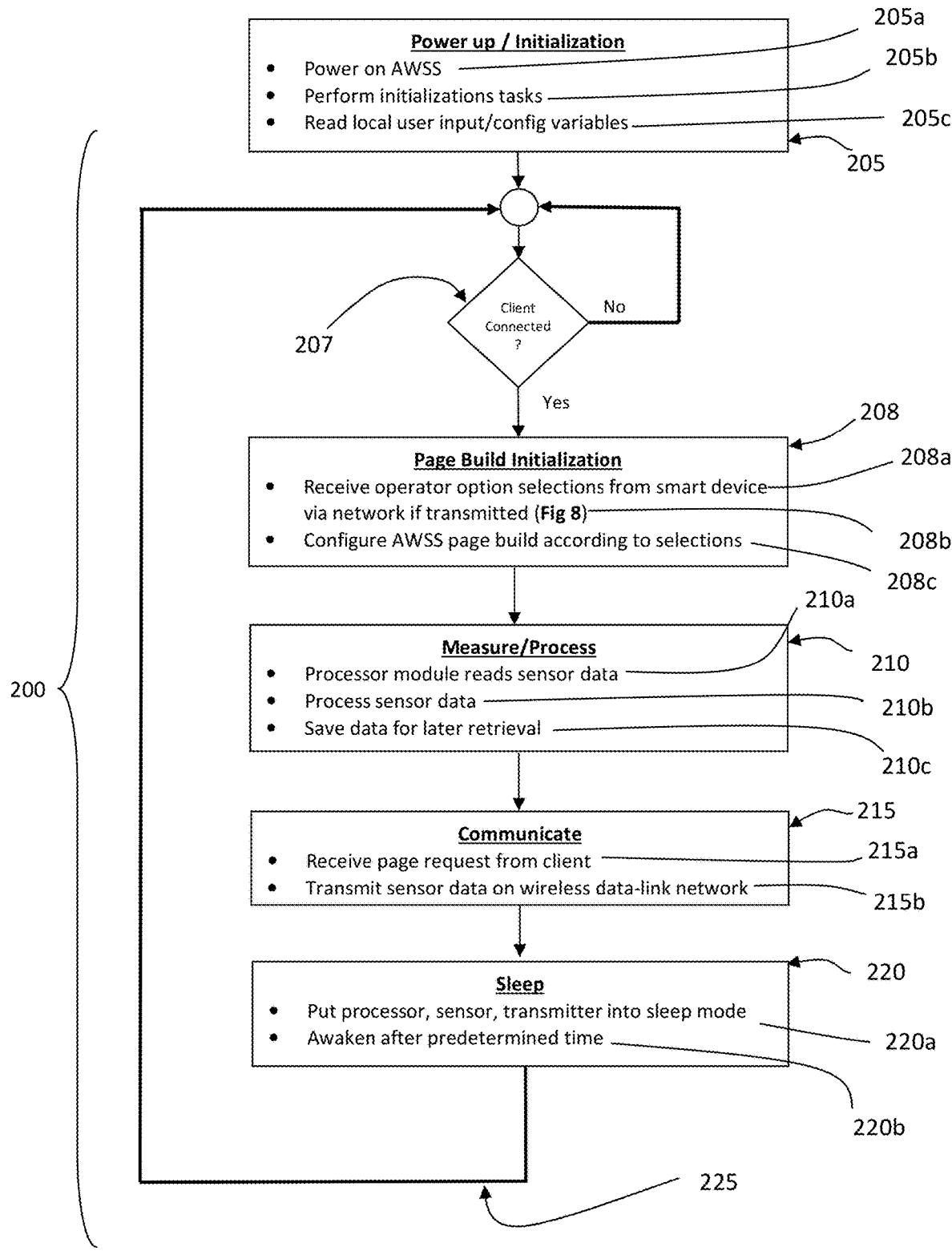
FIGS. 2a & 2b are top level logic flow diagrams illustrating the processes of the airborne and ground processing which might be executed by software applications on the airborne system and smart device respectively.

Computer software instructions 112 ('flight code') loaded into the non-volatile memory of processor module 110 when executed may cause the processes 200 in FIG. 2a to be performed. These instructions will, among other things, control the initialization sequence, data collection & processing and transmission/reception of data on the wireless network. The specifics of these functions are described in more detail below in connection with FIG. 2a.

The AWSS 100 may also include a power module 197 which may be electrically connected to the modules requiring power. Choices for the power source include various batteries such as coin cell batteries, LiPo batteries and the like. Practical considerations for the choice of power module include the voltage, maximum capacity, and maximum current discharge rate, as well as physical concerns such as size and weight. As noted, some components may have a 'sleep mode' whereby the unit may be temporarily put to sleep for a period of time to conserve power and then reawakened later to resume normal functioning.

In an exemplary embodiment, the flight data sensed by the AWSS 100 is transmitted wirelessly to a smart device 150 via a wireless network 199. Smart device 150 may be any one of a multitude of generally available off-the-shelf consumer devices having hardware and software components allowing for wireless connectivity such as Wi-Fi, Bluetooth and or other wireless protocols. In addition to the communication module allowing wireless connectivity, smart device 150 may also comprise a non-volatile memory for storing computer instructions 162, a processor for executing the instructions, and a display system 170 for displaying data and receiving operator input. Example smart devices 150 may be represented by such products as Smartphones, Smartwatches, laptop computers, tablet computers, personal data assistants and others. These devices generally have the ability to connect with a remote server to download applications which may then be executed or 'run' on the device. Such applications are commonly referred to as 'apps.' Examples of servers from which 'apps' are commonly downloaded are Google Play, Apple App Store, Windows App Store and Amazon Appstore to name just a few. The present invention may include such an application 162 adapted to run on the smart device 150. Smart device application 162 will be referred to as 'app code' to distinguish it from the 'flight code' 112 which flies on the AWSS 100. Details of the 'app code' 162 are discussed in detail below in connection with FIGS. 2a and 2b and FIG. 8 and which in turn may produce the Graphical User Interfaces (GUIs) illustrated in FIGS. 9a-g. As described in some detail below, these instructions/code 162 may among other things control the smart device initialization sequence, wireless connectivity, data reception and transmission, processing and display. While in an exemplary embodiment the app/code 162 may be downloaded from an app store server, it might also be factory preloaded and/or field loadable as is well understood in the art. In general the app code allows the device 150 to connect wirelessly to the AWSS 100, receive operator input, transmit the operator input to the AWSS 100 over the wireless network 199, receive data from the AWSS 100 over the wireless network 199 and display the received data.

As has been previously mentioned, wireless network 199 may comprise Wi-Fi (IEEE 802.11), Bluetooth (IEEE 802.15.1), Zigbee (IEEE 802.15.4), cellular, ISM, WPAN, etc. In a first exemplary embodiment, Wi-Fi is used. In another exemplary embodiment, Bluetooth is used. It is also contemplated that both protocols could be used in a single network to connect different devices. Also contemplated is a second wireless network which would connect a plurality of smart devices 150a, 150b etc.

While in an exemplary embodiment the smart device 150 may be represented by such products as smartphones, laptop computers, tablet computers, personal data assistants and others, it is also envisioned that the smart device 150 could be a specially manufactured device specifically for the purpose of interfacing with the AWSS 100.

Figure 2B:
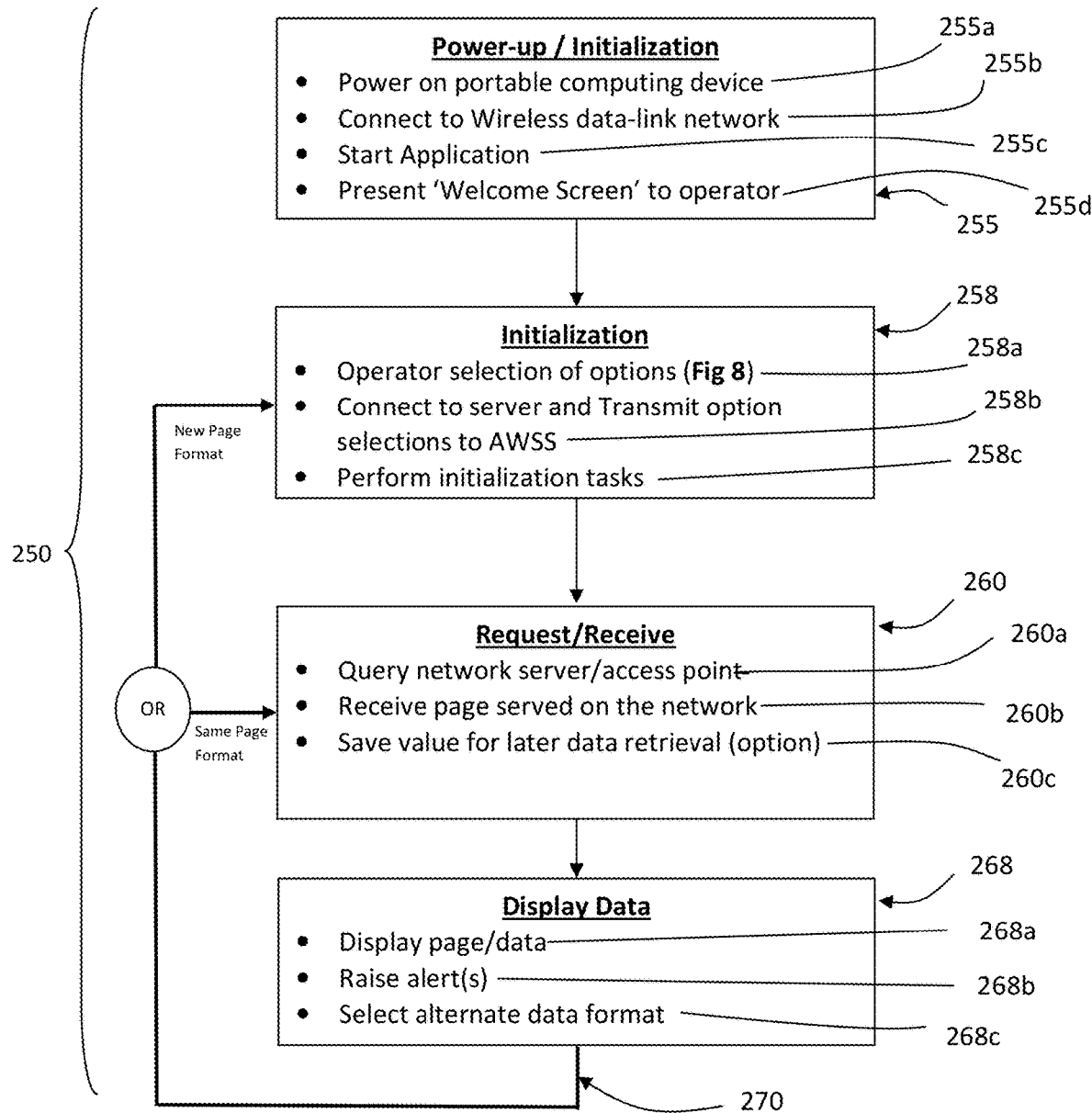

Turning then to a discussion to the processes involved in the operation of the system, FIG. 2a illustrates the data acquisition and processing 200 which may be associated with the AWSS 100; and FIG. 2b illustrates the initialization and data display processing 250 which may be associated smart device 150. Note that the tasks and processes depicted in the flow diagram 200 and 250 may be accomplished by different elements of the AWSS 100 and smart device 150 and may be executed in hardware, firmware or software and maybe executed in an order different than that shown.

In one exemplary embodiment, the process steps of FIG. 2a are implemented in software code 112 ('flight code') executable by processor 110 on AWSS 100. In another exemplary embodiment, the process steps of FIG. 2b are implemented in software code 162 ('app code') executable by the processor in smart device 150. Note that in conjunction with discussion of data flow on network 199 the AWSS 100 and smart device 150 will sometimes be referred to as the server and the client respectively.

With reference to FIGS. 2a and 2b, whole numbers, e.g. 205 will be used to identify an overall task with sub references e.g. 205a, b, c to identify specific subtasks. Note also the specific sequence of tasks may be varied from that shown in the figures. Additionally not all steps may be required, some may be bypassed under certain circumstances and executed under others or may be bypassed entirely.

Beginning first with the process steps in FIG. 2a, and with continued reference to FIG. 1, power-up initialization 205 begins the instruction sequence. Upon power application 205a to AWSS 100, the software code/instruction set 112 may execute an initialization procedure 205b such as setting the control variables on the sensors 120 and communication module 130, and setting communication rates between the processor 110 and the sensors 120 and communication module 130, initializing variables.

As another example of initialization tasks 205b may be the computation of the zero_AGL_altitude_bias offset. The purpose of this is to compute a bias value which can be used to convert sensed MSL altitude values into AGL altitude values. As mentioned above, many of the altitude sensor modules measure altitude in MSL units. Thus, this calibration method provides a means for converting a widely measured sensor value into a more useful value.

To determine the bias offset, an initial measurement of MSL altitude is made when the UAV is first powered on 205a. Since the UAV is presumably at or very near the ground at the time of power application, this initial MSL reading serves as a zero AGL reading and thus is called the zero_AGL_altitude_bias offset. This initial measurement of MSL altitude is then saved into non-volatile memory of processor module 110. Subsequent measured MSL values may then be converted to AGL by subtracting this zero_AGL_altitude_bias offset from the measured MSL value. Stated mathematically, ($t$~=0): zero_AGL_altitude_bias=pressure altitude $(MSL)_{t=0}$         Eq. 1

($t$>0): AGL_altitude=pressure_altitude$(MSL)_{t>0}$− zero_AGL_altitude_bias         Eq. 2

For the purposes of this disclosure, the terms 'sensed' or 'measured' will refer to the data provided directly from the sensor while the terms 'computed' or 'converted' shall refer to the data resulting from some mathematical processing of the 'sensed' or 'measured' sensor value. Once such example is that just provided wherein the measured MSL altitude is converted to AGL altitude by subtraction of the zero_AGL_altitude_bias from the measured value.

Figure 4:
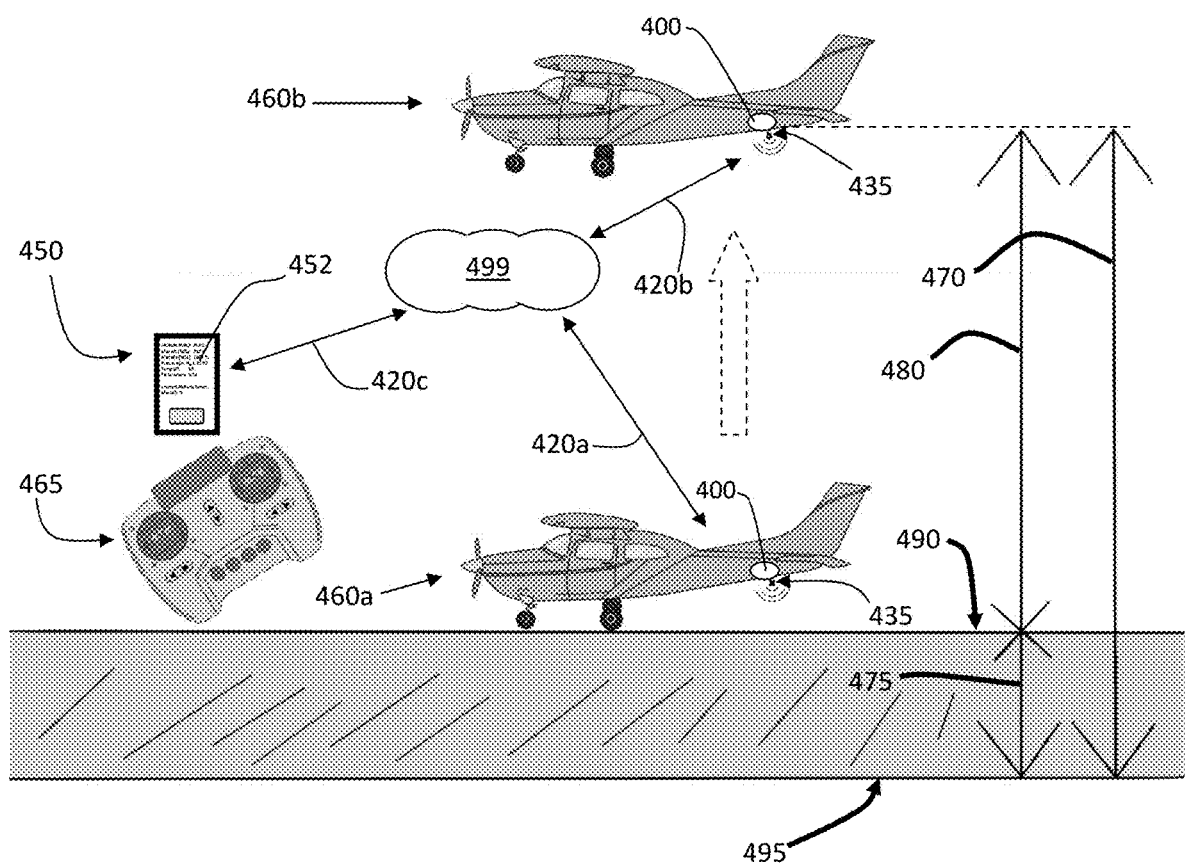
FIG. 4 is an illustration of an exemplary embodiment of the present invention showing the operational environment of the system and process of remotely sensing and displaying UAV altitude including a pictorial representation of the different altitudes discussed in the specification.

While this initialization step is shown as accomplished as part of the process 200 performed by AWSS 100, it could also be done in the smart device 150. A pictorial representation of the different altitude quantities is shown in FIG. 4. Note that this initialization of the AWSS 100 may occur before or after it is attached to the UAV.

Of course as any weather observer knows, local barometric pressure is not a constant. Changes in local pressure cause changes in apparent altitude. Sometimes changes in local pressure can be quite dramatic such as in passing storms. However, during fair weather days, that under which most UAV flying occurs, the local pressure can be considered a constant during the small duration of a recreational air vehicle flight. Furthermore, since the zero_AGL_altitude_bias is determined at each power-up, suspect values can be cured by recycling power and re-establishing the zero AGL bias offset value. Thus, if for any reason the UAV pilot questions the bias value, the unit power may be recycled and a new bias computed. It is further noted that best practice would be to have the receiver powered during the AWSS initialization. This allows, among other things, for the bias value to be checked (i.e. the smart device should show approximately zero while the UAV is on the ground)

The power-up initialization 205 may continue with a reading of local operator/user configuration selections 205c set by the user input interface 140 of the AWSS 100. Such local configuration selections are to be distinguished from other operator selectable configuration settings made on smart device 150 and discussed below. The local settings might include data collection rate, integration constant or the like. Each of these selections, if made, would be saved in the non-volatile memory of the AWSS 100. As mentioned, it is also contemplated that each of these configuration parameters would have a default value 'hard coded' into the instruction set 112 such that no user input is required.

Once the Power-up/Initialization tasks are complete, the code may loop 207 waiting for a client to connect before proceeding further. Once the client connects, the code moves to the Page Build Initialization task 208. Alternatively the code may proceed directly to measurement block 210 and broadcast flight data 215 in the 'blind' to no particular client.

As part of the Page Build Initialization task 208, the AWSS 100 may receive operator selected display data format commands. As described in more detail with FIG. 2b, in conjunction with the smart device initialization, the operator may be presented with the option to select a preferred display data format for display of the flight data from the AWSS 100 by making selections on smart device 150. These selections would be communicated to the AWSS 100 through the wireless network 199. As described below, these selections may tell the server (AWSS 100) what page build display data format to use in servicing requests from client smart device 150 such display data format selections may include data content, units selection, alerting and other parameters as described below. If such selections are made and sent by client smart device 150, they are received 208a and processed 208b/208c in the page build initialization task 208. In an exemplary embodiment, Page Build Initialization task 208 may be executed on each pass through the code execution loop allowing the operator to reselect display options at anytime. The server stores these selections received from the client and uses these them to build the data display pages upon request of the client. As part of the AWSS initialization sequence 208, the AWSS 100 may send smart device 150 an indication that the AWSS 100 initialization has been completed.

Once Page Build Initialization 208 tasks (if any) are complete, the Measurement/Process task 210 may begin. Referring once again to the components in FIG. 1, during the measurement phase 210, processing module 110 periodically receives the data output 210a of sensor module 120. In an exemplary embodiment, the sensor module 120 may be surveyed at a constant periodic rate. An alternative embodiment is to acquire sensor data based on execution of an interrupt service routine responding to interrupts by the sensor 120 signaling data availability.

Once sensor data has been acquired from sensor module 120, it may be processed 210b. Depending on the nature of the data, the processing varies. For example, if the data is altitude, some computation may occur to accomplish the conversion from sensed MSL altitude to computed AGL altitude according to the principles discussed above.

Once the data has been processed 210b it may be stored into AWSS memory for later retrieval 210c. For example, in one contemplated exemplary embodiment, the flight data from the AWSS 100 may be retrieved from memory once the vehicle has landed in order to facilitate post flight data analysis. Conventional data transfer means such as USB port download may be used for retrieval of the flight data.

After data acquisition, processing and storage, it is ready to be communicated 215 to smart device(s) 150. Communication of data from the AWSS 100 to the smart device 150 (and vice versa) is facilitated through a wireless network 199. Various types of wireless network protocols have been discussed elsewhere. In one exemplary embodiment, the wireless network is a Wi-Fi network. In this embodiment and as described above, the AWSS 100 may be configured as a wireless access point (WAP) with the smart device 150 operating as a client. In this embodiment, the AWSS 100 acts as a 'server' serving up data and/or 'pages' upon request of the client. Client/smart device 150 periodically sends requests 260a (FIG. 2b) to which the AWSS/server 100 may respond 215b with 'pages' to be displayed on the client/smart device 150. As described below, the form and content of such 'page' may be determined by operator selections on the client/smart device 150 which are transmitted to the AWSS/server 100 on demand from the client/smart device 150 whenever the operator chooses to make a display data format selection.

Once the transmission sequence 215 is complete, the 'sleep' task 220 may begin. In the 'sleep' task 220 the AWSS 100, sensor module 120 and/or communication module 130 may be put into a sleep mode 220a awaiting the next request from the smart device 150. The sleep cycle may last for a predetermined time after which the AWSS 100 may be 'awakened' 220b or the sleep cycle could be ended by some external interrupt or the like. A sleep cycle allows the power consuming components to be put into a reduced power consumption mode which is typically orders of magnitude less than its normal consumption. This greatly extends the battery life allowing for a longer operating time. Of course if the battery has sufficient capacity, consumption concerns may not necessitate utilization of a sleep function.

Return sequence 225 may return to the client connection loop 207. If a client is connected, the process steps of FIG. 2a proceed. If an alternative page display data format selection has been made and transmitted to the AWSS/server 100 via network 199 this selection may be processed in the code 112 and the transmitted page build format adjusted accordingly 208c. If no alternative selection has been made, the prior selected (or default) format may be retained.

Thus is described is a process where the AWSS 100 services requests from the client smart device 150 for page requests of UAV flight data and/or services requests for changes to the format of the flight data pages.

Referring to FIG. 2b and with continuing reference to FIG. 1, the process flow of the smart device 150 is shown. In an exemplary embodiment, the process flow illustrated in FIG. 2b could be implemented by the 'app code' 162 resident in the nonvolatile memory of smart device 150 which when executed could perform the steps illustrated in the figure.

The sequence begins with power-up initialization task 255. As is well understood in today's connected society, a typical smart device 150 contains a plethora of applications, some preinstalled and others downloaded from one of the many 'app stores.' As mentioned, it is contemplated in one embodiment of the present invention that the 'app code' 162 will be downloaded from one of the app stores. If the process steps illustrated are to be executed by app code 162, it is presumed that the app 162 has been previously downloaded either from one of the 'app stores' or directly from applicant's web site onto the smart device 150 and into smart device's non-volatile memory where it may be executed by the smart device processor.

Smart device application process begins with power application 255a. The user then connects the smart device to the AWSS network 199. The connection process 255b uses procedures common and well understood by users of smart devices and may be done either manually or automatically depending on how the smart device user has configured his device settings. Also as is common in networking, the server/AWSS 100 may have configuration settings such that a password is required to connect to the network 199 thereby protecting the network from unauthorized access.

The application itself may then be started 255c subsequently or concurrently with accessing the wireless network. After the application is executing, a 'Welcome' screen may be presented to the operator 255d giving him/her the option of proceeding directly to flight operations with a default data screen display or selecting tailored display options. This is discussed in much greater detail below in conjunction with FIGS. 8 and 9a-g. After making a selection from the 'Welcome' screen the process may move to the initialization sequence 258.

The initialization procedure 258 may begin by processing the 'Welcome' screen selections 258a. If the operator chooses the default display option, a connection is made to the server/AWSS 100 through network 199 and the selection transmitted 258b to the server/AWSS 100. If the operator opts for a more tailored selection, a series of GUI pages (FIG. 8) is presented to the operator. These pages allow the operator to select a variety of options associated with operation and display of data. These options will be discussed in more detail below in conjunction with FIG. 8. After the selections are made, a connection is established and the selection transmitted 258b to the server/AWSS 100.

The client smart device 150 may also perform any initialization tasks 258c. Examples of such tasks may be to set any loop or process execution delay constraints, initializing variables and the like. As mentioned above, as part of the AWSS initialization sequence 208, the AWSS 100 may send smart device 150 an indication that the AWSS 100 initialization has been completed. Smart device 150 may optionally display some indicator from AWSS 100 that the selections have been received and the initialization complete.

After completing the initialization task 258 the request/receive task 260 may make a request for data transmitted from the AWSS 100. In one embodiment, with the AWSS performing as a server or access point, the request/receive task 260 may connect and thereafter send a page request 260a though network 199 to server/AWSS 100. As mentioned, one exemplary embodiment utilizes the Hypertext Transfer Protocol (HTTP) to transfer data from the server/AWSS 100 to the client/smart device 150. In this exemplary embodiment and by processes well understood in the art, the server provides a 'page' to the client making the request. After receiving the page from the server 260b, the client smart device 150 may display the page 268a as sent by the server on the smart device's display area 170. The data page would contain the data in a format consistent with the operator display data format selections made during the initialization activity 258.

In an alternative embodiment, the instruction code 162 of client/smart device 150 might create its own page formats for displaying sensed data using the data sent by the server as the data source but presenting the data in a format maintained by the client/smart device 150. It is also contemplated that received data may be saved into memory 260c for retrieval after the flight and used in post-flight data analysis.

Another feature of the display task 268 may be the performance of an alerting function 268b. This may be a feature enabled during the initialization process 258a (see also FIGS. 8 and 9). If this function has been enabled, an alert may be generated upon the altitude attaining a value above some maximum or below some minimum value. For example, if the received altitude exceeds the legal 400 AGL limit, the smart device display area 170 may display an alert in the form of an annunciation, 'blanking' the display area, 'dashing' the displayed data or the like (FIG. 9g).

A further optional feature of the display task 268 may be the selection of an alternate display data format 268c. As mentioned briefly above and discussed in more detail below (FIG. 8), the user may be given the option of displaying data in different formats (display data format selection). This option may be initially presented during the start-up 'welcome' screen 255d. In addition, the operator may be given the chance to change formats at any time by the presentation of the option selection data display pages 268c. The return path 270 may be determined by whether the user selects an alternative display format. If so, then the flow returns to 258 whereby the selection may be made and transmitted to the server (AWSS 100) as described above, such that when pages are subsequently requested by the client smart device 150, the pages are provided in the newly selected format. If the user makes no new selection then the process flow may return to request/receive task 260 and the execution cycle repeated.

In an exemplary embodiment, the instruction set 162 is executed in a continuous loop. In such a cyclic execution, once the page display is accomplished 268, the process returns 270 to the initialization task 258 or to the request/receive task 260 (depending on whether a new format selection has been made) and executes another page request to the server (AWSS 100). The execution loop may execute a preprogrammed delay.

It should be apparent that the steps, tasks and functions described above may be performed by software, hardware or firmware. It should also be apparent that additional or alternative steps relative to those described below may also be performed. Also steps may be reordered from what is shown.

Figure 3:
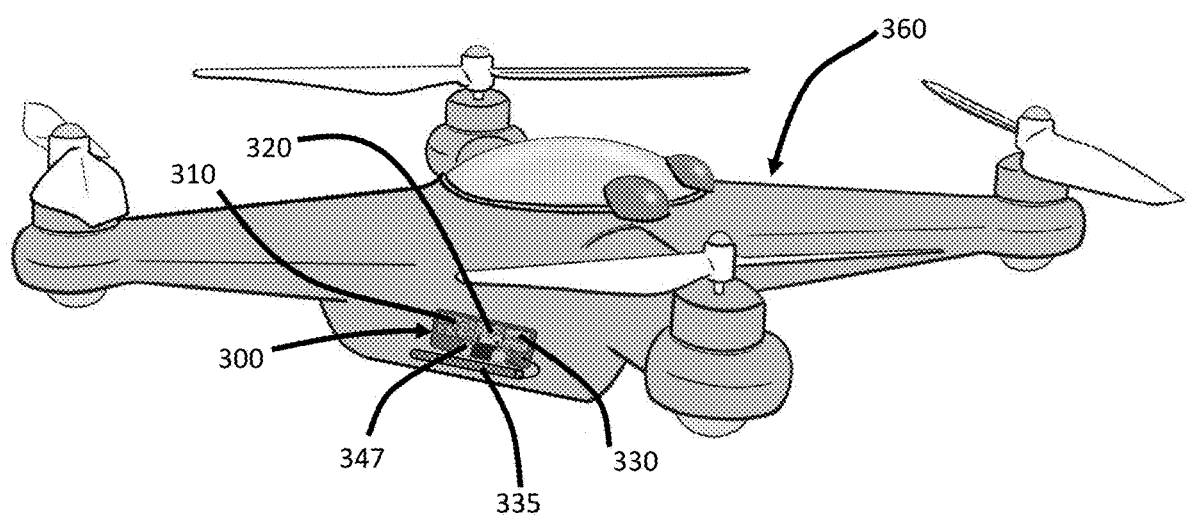
FIG. 3 illustrates an exemplary embodiment of a removable association of the stand-alone Airborne Wireless Sensor System (AWSS) with a recreational UAV.

FIG. 3 illustrates how the Airborne Wireless Sensor System (AWSS) 300 is associated with a small UAV 360. In the figure, the AWSS 300 is shown in exaggerated size relative to the UAV to illustrate the various components thereof.

In an exemplary embodiment, the AWSS 300 may be removably attached, strapped or otherwise temporarily physically associated with the UAV 360 using Velcro®, Scotch® mounting putty or restickable strips, Glue Dots®, straps, clips, ties, rubber bands even tape or the like. The idea is that the AWSS 300 is small enough and light enough that it is easy to temporarily secure to the UAV and then after a flight can be easily removed and attached to another UAV. When the UAV 360 takes flight, the AWSS 300 is carried aloft with the vehicle owing to its physical attachment thereto. It is important that the operator of the UAV determine an attachment position on the UAV 360 such that weight & balance and flight characteristics of the UAV 360 are not substantially affected. This is facilitated by the lightweight and small size of the AWSS 300. It is important to note that the AWSS 300 is 'stand-alone.' Other than the temporary mounting of the AWSS 300 on the UAV 360, there is no physical or electrical interconnection or integration between the AWSS 300 and the UAV 360.

As seen in the figure, AWSS 300 comprises a processing module 310, a sensor module 320 and the communication module 330. Also shown in the figure is an independent power source 347. Also illustrated is the optional external antenna system 335 which could be used by the communication module 330. The size and positioning of the antenna 335 is exaggerated in the figure to more clearly illustrate its existence. In an exemplary embodiment, a printed circuit board (PCB) trace antenna may be utilized as the antenna and external antenna 335 would be unnecessary. In another exemplary embodiment, the antenna may be a wire that would be in a folded positioned along side of the AWSS 300 so as to not interfere with flight operations.

FIG. 4 illustrates how the present invention would be employed in a typical use scenario, specifically in the embodiment where altitude is one of the monitored flight data. The Airborne Wireless Sensor System (AWSS) 400 may be removably attached to a UAV 460 using Velcro®, Scotch® mounting putty or restickable strips, Glue Dots®, straps, clips, ties, rubber bands even tape or the like, as described above. In the figure, the UAV 460 is shown in two positions 460*a* and 460*b* corresponding to an initial ground position and an airborne flight position respectively, illustrating the process whereby AGL altitude 480 may be computed.

Referring to FIG. 4, a variety of altitudes and elevations are depicted. Reference numeral 495 represents Mean Sea Level (MSL). Reference numeral 490 represents the ground level and 475 represents the elevation of the ground level above sea level (zero_AGL altitude_bias). Altitudes 470 and 480 both represent the altitude of the UAV. Altitude 470 represents the UAV altitude relative to mean sea level, referred to generally as xxx feet MSL, and 480 represents the UAV altitude relative to the ground level, referred to generally as xyz feet AGL. Thus it is clearly seen from the figures that the altitude of the UAV above the ground 480 is represented by its altitude above sea level 470 minus the elevation of the ground 475. (i.e. in reference numeral terms, measured msl_altitude 470−elevation 475=agl_altitude 480). Thus ground elevation 475 represents the zero_AGL_altitude_bias discussed above.

As discussed above in connection with the initialization tasks in 205, zero_AGL_altitude_bias 475 may be determined when power is initially applied to the (AWSS) 400 when the UAV is sitting on or near the ground as shown in the FIG. 4 as position 460*a* (t~=0). Once acquired, the zero_AGL_altitude_bias 475 may be saved off in non-volatile memory. Subsequent altitude measurements are adjusted for this value by the process described above, to obtain the real time UAV AGL altitude, e.g. 480.

The AWSS 400 transmits the altitude values and/or other data to the smart device 450 via wireless network 499. Depending on operator selections made, both the sensed/measured MSL altitude as well as the computed AGL may be transmitted. As mentioned, smart device 450 may be a phone, portable data assistant, laptop, or smartwatch or the like. Smart device 450 may be removably attached to ground control station 465 or may be positioned elsewhere within visual proximity of the remote pilot. Communication from the airborne unit 400 to the smart device 450 via wireless network 499 may be facilitated through antenna 435 which is shown in exaggerated size and position so as to illustrate its existence. As mentioned, in an exemplary embodiment, the antenna may be a printed circuit board (PCB) trace antenna which would substitute for the external antenna 435 shown in the figure. Communication may also be conducted from the smart device 450 to the airborne unit 400 via wireless network 499 for setting display parameters, formats and the like as discussed elsewhere. Communication to and from wireless network 499 may take place when the UAV is on the ground 460*a* (via path 420*a*) or airborne 460*b* (via path 420*b*).

Smart device 450 is shown in the figure to utilize a display area 452. In an exemplary embodiment, display area 452 may be realized as display screen on a smartphone, tablet or the like but could also be a display on a smartwatch. Whatever its form, its purpose is to display the altitude and/or other data transmitted by AWSS 400. Displayed data may be in the form of textual and/or numerical data and/or may include graphical representations as described more fully below. Additionally, it is anticipated the smart device 450 might be removably attached to the ground control station 465 (see FIGS. 6 and 7); in other embodiments the smart device 450 may be positioned remotely from the ground control station 465 but proximate to the remote pilot or the Visual Observer. Still further, if the smart device takes the form of a smartwatch, the device may be worn on the wrist, see FIGS. 5 and 7.

Figure 5:
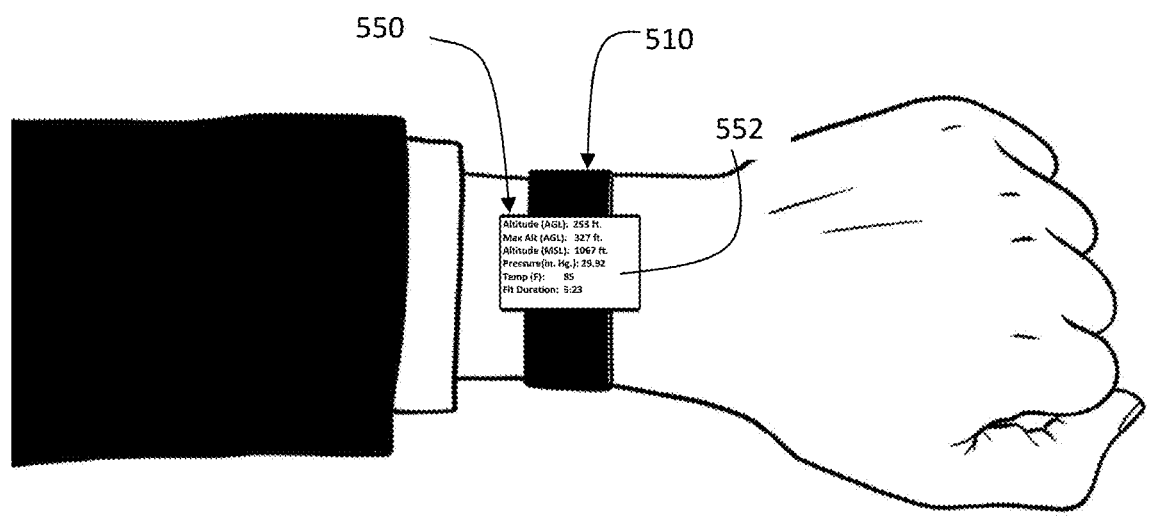
FIG. 5 illustrates an exemplary embodiment of the smartwatch realization of a smart device.

FIG. 5 shows another exemplary embodiment wherein the portable computing device or smart device is a smartwatch 550. Smartwatches are a relatively new phenomenon combining the features of a watch and a computer similar to the combination of the computer and phone to create the smartphone. Because of their relative newness, functionality is developing rapidly. Some smartwatches include the ability to communicate through a wireless network by integrating a Wi-Fi and/or Bluetooth wireless connectivity as part of the device. Similar also to smartphones, smartwatches utilize various operating systems (OS) to perform their computing functions. Some current examples of smartwatch operating systems are watchOS (Apple), Android (Google), Android Wear (Google), iOS (Apple) as well as other proprietary operating systems. The particular OS utilized is unimportant as long as the watch system allows applications to be loaded into the watches' nonvolatile memory for execution by the watch processor. For example, one of the app stores mentioned previously may allow for the download of apps to the smartwatch.

As illustrated in FIG. 5, smartwatch 550 comprises many of the same elements as a traditional digital watch. Smart device 550 may be secured to a wrist band 510 which may be in turn removably secured to the wrist in the traditional fashion. Smartwatch 550 includes a display system 552 for displaying various data. Typical display technologies employed include Organic Light Emitting Diode (OLED), Active-Matrix OLED (AMOLED), and Passive-Matrix OLED (PM-OLED). In typical utilization, the smartwatch may be capable of displaying text and graphics.

The physical size of the display system 552 may be smaller than that of other smart devices such as a smartphone, tablet etc. Thus, the amount of data which can be displayed may be more limited than for the larger devices. Nonetheless, sufficient space exists for the display of important data such as altitude and alerts. It is envisioned the watch may be worn on the wrist of the remote pilot or worn by the Visual Observer who could call out altitudes at the pilot's request. Alternatively, the smart watch could be strapped to some appendage of the control station.

As described in more detail below in conjunction with FIG. 7, it is anticipated that smartwatch 550 could be connected through wireless network directly to the AWSS or via a wireless relay to another smart device. Reception and display of data would be similar to that as described for other smart devices such as the smartphone. The smartwatch could be connected to the wireless network and thereafter present requests to the server/AWSS for data pages which would be transmitted and displayed on the smartwatch.

Figure 6:
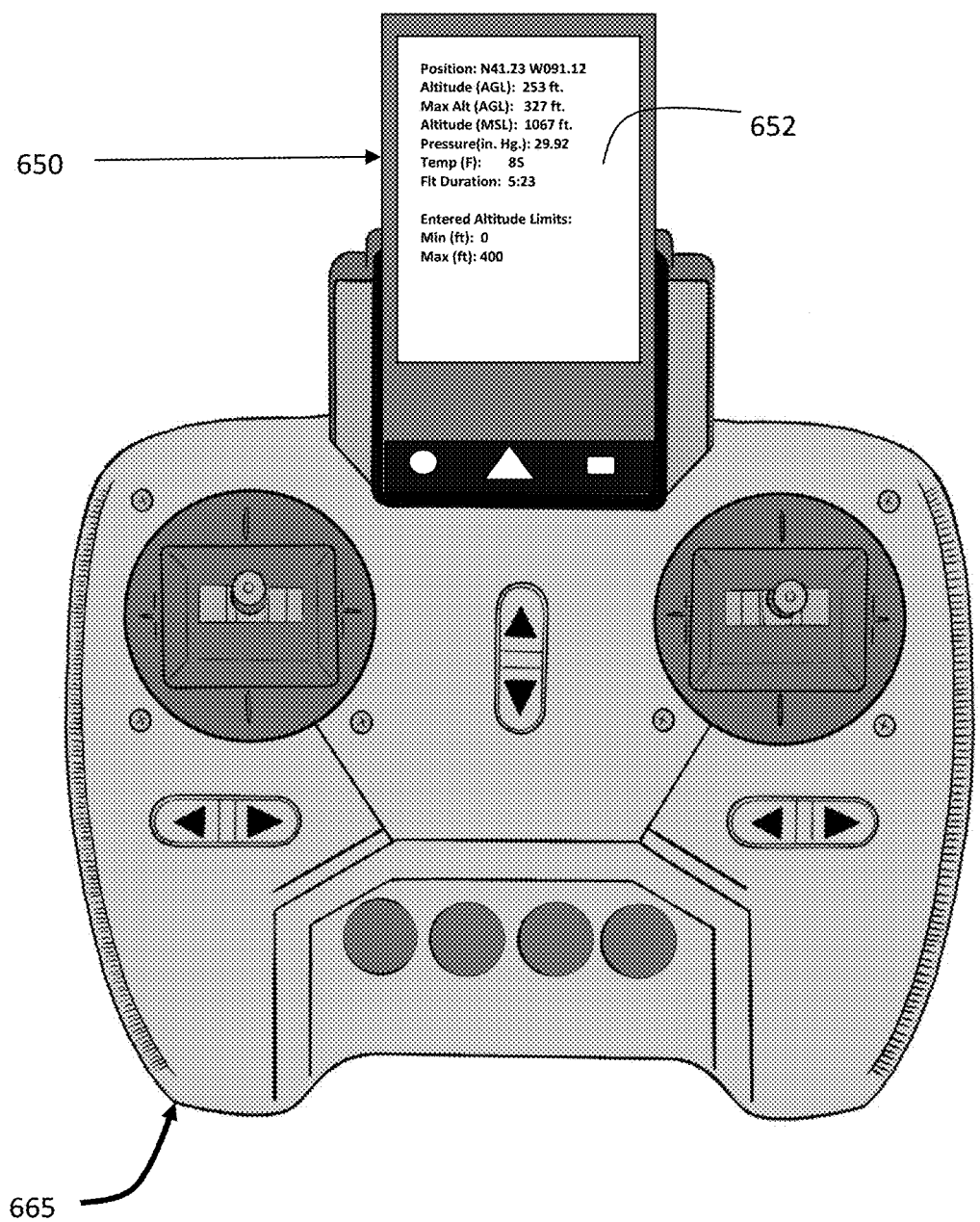
FIG. 6 illustrates another exemplary embodiment of a smart device, realized as a smartphone, and how it might be mounted to the hand controller ('control station') of the UAV.

FIG. 6 illustrates an alternative exemplary embodiment where the smart device 650 may be removably attached to the ground control station 665. Attachment may be by any or a number of means such as a cradle, bracket or even Velcro®. Numerous ground control stations 665 come with a bracket device adapted to cradle a smartphone or similarly sized smart device in a position for easy viewing during flight operations. As seen in the figure, the smart device 650 may be placed in a position such that the display screen 652 faces the remote pilot when operating the ground station 665 controls. This positioning maintains a visual orientation that permits the pilot to maintain a close visual inspection of the flight data.

Figure 7:
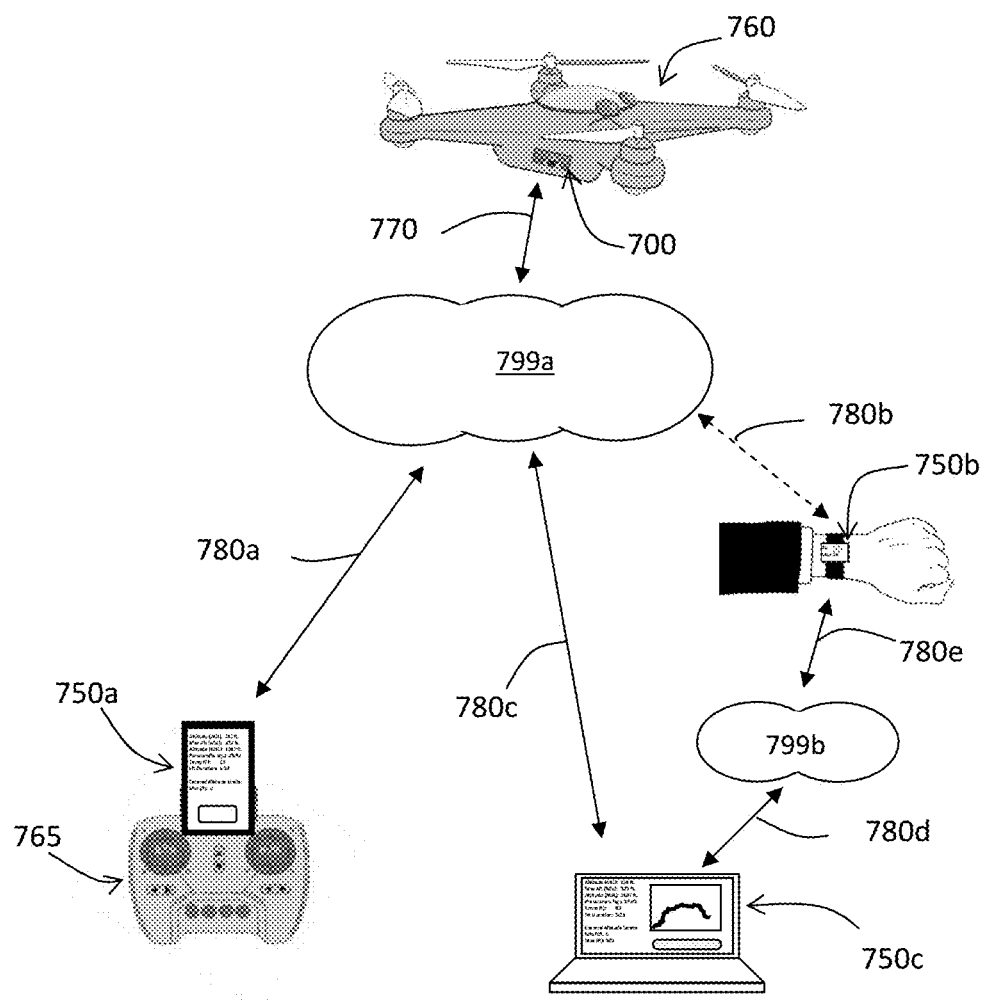
FIG. 7 illustrates a network topology with the connection of a plurality of smart devices to the AWSS through one or more wireless data networks.

FIG. 7 illustrates the wireless data network of the present invention and its employment in various modes of operation with a plurality of smart devices 750a-c and a plurality of networks 799a, b. In a first illustrative embodiment, AWSS 700 may be attached to airborne UAV 760 transmitting altitude and/or other data to the wireless network 799a via radio path 770. One or more smart devices for example 750a, 750b and/or 750c connect to the wireless network 799a using RF signals 780a, 780b and 780c respectively. As described above, in a preferred embodiment, wireless network 799a may be a Wi-Fi network. In other embodiments, wireless network 799a may be a Bluetooth wireless network and in still other embodiments both Wi-Fi and Bluetooth may be utilized. For example, connection path 780a to smart device 750a may utilize the Wi-Fi protocol while communication patch 780b may utilize the Bluetooth protocol.

In a second illustrative embodiment, multiple wireless networks may be utilized wherein a smart device may receive data via a relay path instead of a direct connection to network 799a. As an example of that embodiment, one smart device may connect directly to a first wireless network via a first RF path while a second smart device may connect to the first smart device via a second wireless network. One use for such an arrangement is where one of the devices is too large or too heavy to be positioned in proximity to the pilot or where one of the smart devices does not have adequate communication power or proper protocol to communicate directly with the AWSS. An example is illustrated in FIG. 7.

First smart device 750c may be a laptop or tablet, or the like located remotely of the ground controller say on a table, ground or the like. Second smart device 750b may be a smartwatch or the like worn by the pilot or remote observer. Smart device 750c could receive the signal transmitted by the AWSS 700 through first network 799a via a first RF path 780c. First smart device may then relay the received data via a second RF path 780d through second network 799b to the second smart device 750b through path 780e. Additionally the first and second networks 799a, 799b need not necessarily utilize the same wireless protocol. For example first network 799a might be a Wi-Fi network for RF path 780c and the second network 799b might utilize the Bluetooth protocol for paths 780e, 780d. Employment of this embodiment might be beneficial when the desired display device e.g. 750b lacks the ability to communicate directly with the first network 799a. For example perhaps its communications module has insufficient receiver sensitivity or perhaps its wireless technology protocol is incompatible with the first network. In that situation a larger device perhaps with greater communications capability or range or which employs protocols of both first and second networks can be used as a 'base station' which receives a signal from one network and relays the signal out on another network. As just one example a laptop or tablet 750c may be used as the first smart device operating as a base station receiving data from Wi-Fi network 799a and rebroadcasting the data over a Bluetooth network 799b to a smartwatch 750b.

Figure 8:
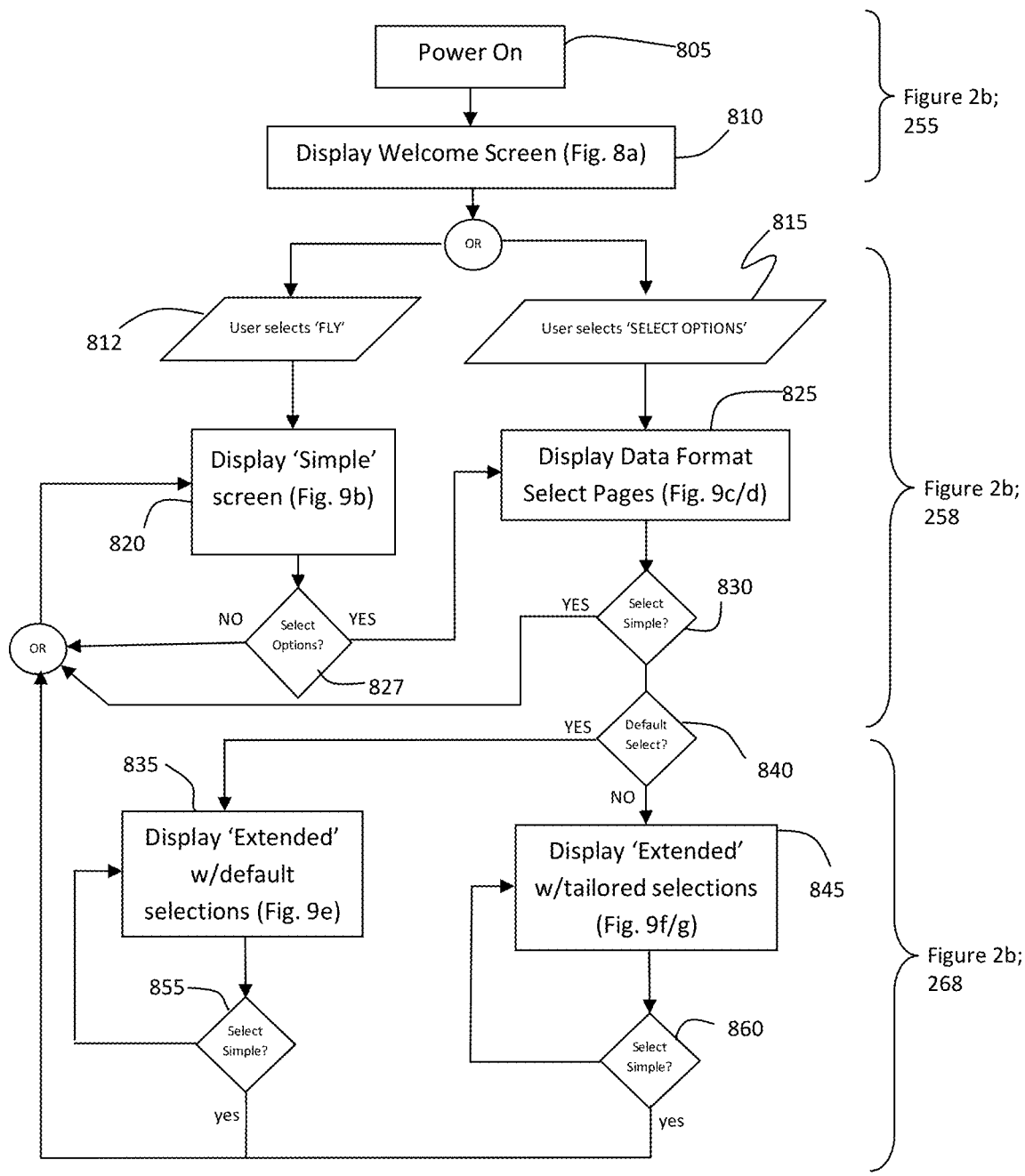
FIG. 8 illustrates one example of the process executed by the smart device 'app code' including operator selection of graphical user interface (GUI) screens (i.e. display data format selections) and the display of flight data implemented on a client device of the present invention, the process steps are correlated to GUI screen shots in FIGS. 9a-g.
Figure 9A:
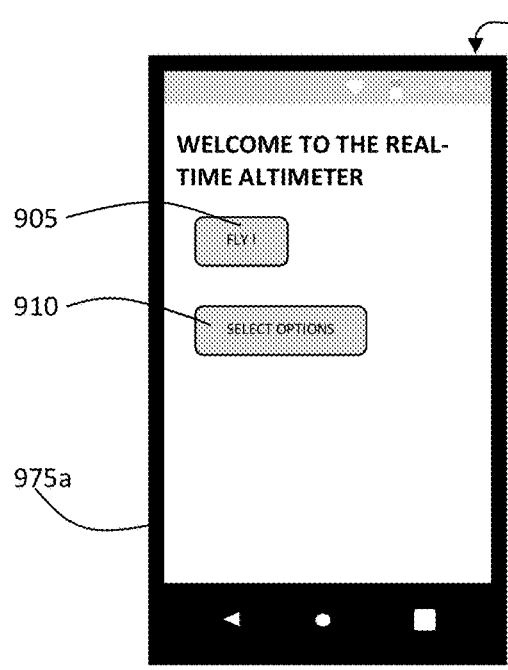
FIGS. 9a-g illustrate some graphical user interface (GUI) screen shots as they might appear on a client device implementing the process of the present invention.
Figure 9B:
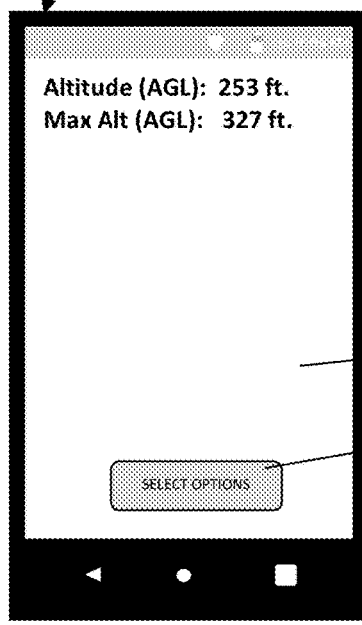

FIG. 8 illustrates one embodiment of page flow/display selection logic used in constructing the layout or pages on the client device. FIGS. 9a-g illustrate one embodiment of screenshots of graphical user interfaces (GUIs) illustrating various possible format selection screens and data displays on the client smart device 150. When describing the display interfaces in FIGS. 8 and 9a-g reference will also be made back to the process functions in FIG. 2b (referenced using the braces). For ease of discussion the two figures will be discussed concurrently. Reference numerals will identify which figure is being referred to with 8xx series numbers referring to FIGS. 8 and 9xx series numbers referring to FIGS. 9a-g.

Upon activation of the application 162, a 'Welcome' screen may be presented (FIG. 8, 810; FIG. 9a, 975a). From this screen the operator may decide if he is ready to proceed immediately to flying with the minimum (default) set of display parameters, or whether he/she desires to select a more specific set of display parameters. If the decision is to proceed immediately to flight with a so called 'simple' display set, the 'FLY' button 812, 905 may be selected which may result in the 'simple' display format set shown in FIG. 9*b*.

Figure 9C:
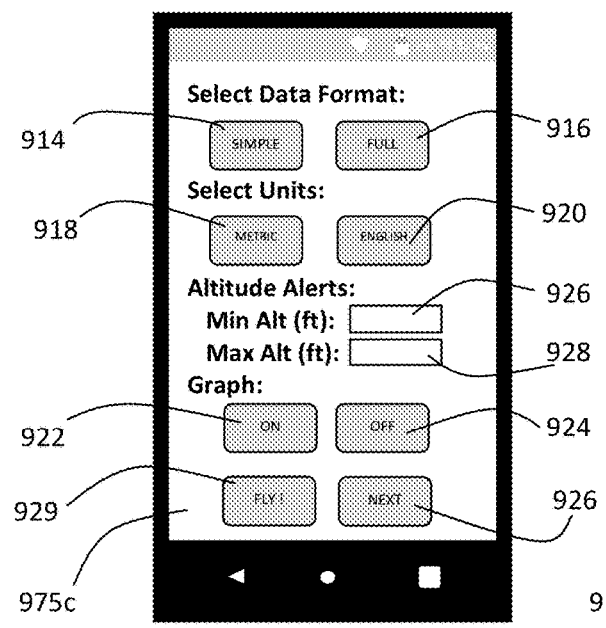
Figure 9D:
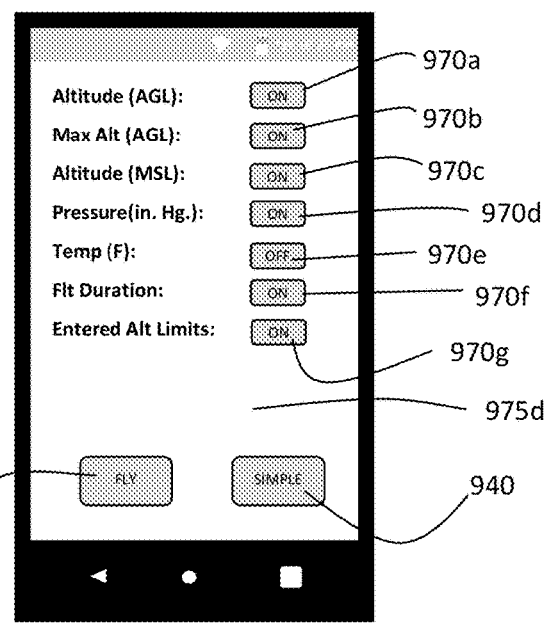

Alternatively the 'SELECT OPTIONS' button 815, 910 may be selected leading to page(s) allowing for data content and format selections FIGS. 9*c*-*d*. It must be noted here that the display sets shown in the figures are for illustrative purposes only. It is obvious that various data parameters may be substituted for the ones shown. The point being that the operator is given choices as to what data is to be displayed. The 'simple' format would be a limited data set of parameters. Shown in the figure for illustrative purposes are current altitude (AGL) and the max altitude (AGL). Current altitude would of course be the altitude currently sensed by the sensor module and transmitted over the wireless network. Max altitude might be the maximum altitude sensed by the sensor since the most recent power application to the AWSS 100. For US versions of the device, the default units may be in feet. European or other metric unit countries may have the default units in meters.

In the exemplary embodiments the operator would be given an option of selecting the alternative display data format. Thus, when the 'simple' format display is shown as in FIG. 9*b*, a SELECT OPTIONS button selection 930 may be available to switch to the 'extended' format display. Conversely when the 'extended' display is active, the choice would be given to switch to the 'simple' display 940.

Turning now to a description of the options selection page 815, 975*c*, 975*d* by way of illustration only and without limitation, the operator may be given the option of returning to the 'simple' format display FIG. 8, 830; FIG. 9*c*, 914 or proceeding immediately to an 'full' format display with default parameters FIG. 8, 840; FIG. 9*c*, 916. A second optional selection may be the units for displaying data; the options may be US FIG. 9*c*, 918 or metric units FIG. 9*c*, 920. The operator then may have the option of entering altitudes for alerts both minimum FIG. 9*c*, 926 and maximum FIG. 9*c*, 928. The operator may have a choice of displaying a graph FIG. 9*c*, 922, 924. In the exemplary embodiment, the graph is a visual representation of the altitude verses time.

At the bottom of the page, a 'FLY' button FIG. 9*c*, 929 may be presented, the selection of which then takes the operator to the 'extended' display page, thereby bypassing the data toggle selection page FIG. 9*d*. Having bypassed the data toggle page (FIG. 9*d*) the default selections of the toggles would be used FIG. 8, 835. If instead the operator chooses the NEXT selection FIG. 9*c*, 926, the page format in FIG. 9*d* may be provided. As seen in the figure, a series of ON/OFF toggles is presented for each of the possible data items FIG. 9*d*, 970*a*-970*g*. Selection of ON causes the parameter to be displayed and selection of OFF causes the parameter to be hidden. The list of items shown is for illustrative purposes only and the actual list may contain more, less or different items. In one exemplary embodiment the parameters of Altitude (AGL), maximum altitude (AGL), altitude (MSL), Pressure, Temperature, Flight Duration, Entered Altitude Limits may be presented for display. Control toggles 970*a*-*g* are provided to turn each data element ON or OFF. While an exemplary list of display parameters has been shown, it will be clear that numerous other parameters are available such as position, accelerations, altitude trend vector, battery status and the like.

Figure 9E:
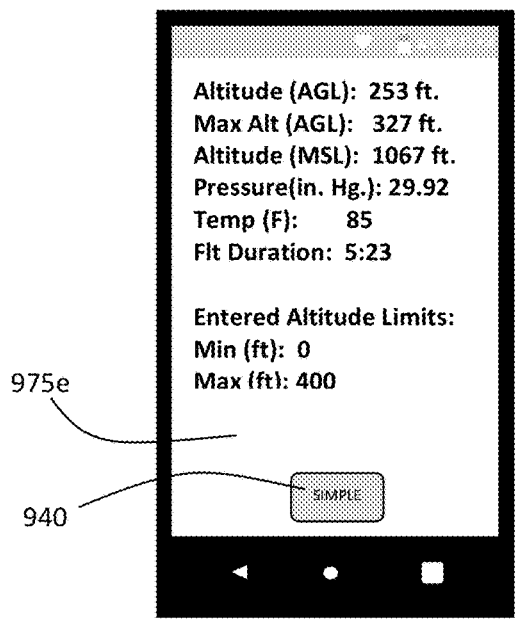
Figure 9F:
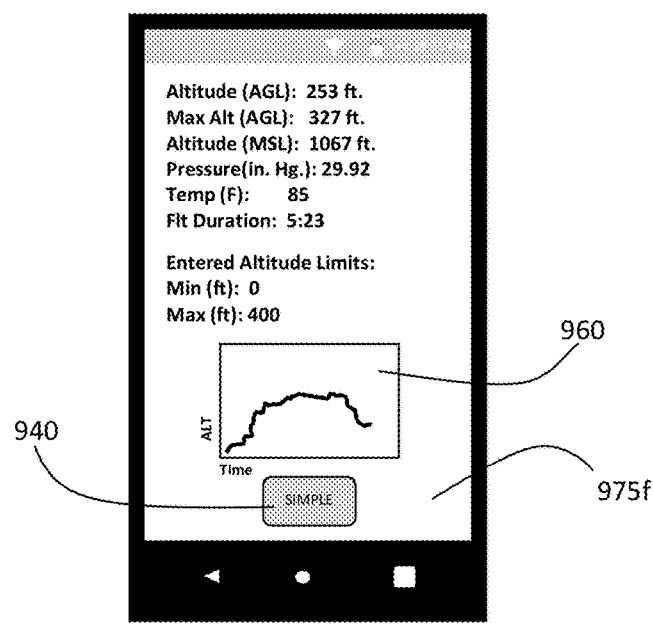
Figure 9G:
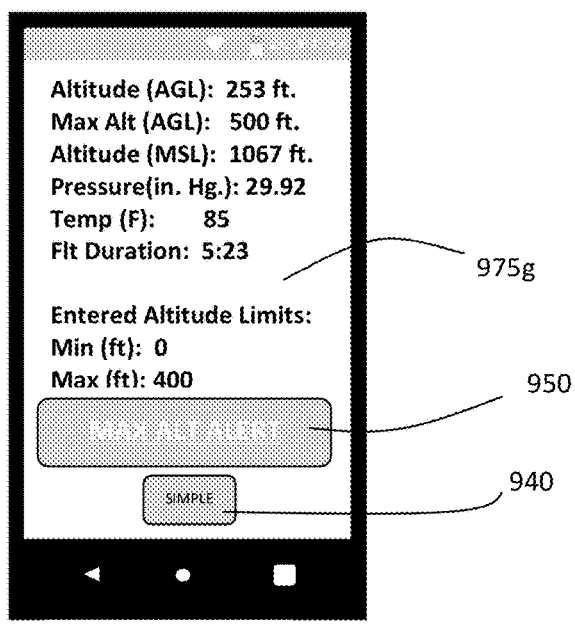

Once the desired toggle settings are selected, the operator may select the FLY button 929 at the bottom of the page which would then result in the display of data page reflecting the selected parameters FIG. 8, 845. Examples illustrating different settings are shown in FIGS. 9*e*-*g*. Also at the bottom of the extended format pages is the SIMPLE selection FIG. 8, 855, 860; FIGS. 9*d*-*g*, 940 the activation of which would return the operator to the display shown in FIG. 9*b*.

FIG. 9*e* illustrates an example page where the 'extended' format with the graph toggled to OFF has been selected. An illustration of an 'extended' data page with the graph toggled ON is shown in FIG. 9*f*.

As described in connection with FIG. 9*c*, the operator may be given the opportunity to enter minimum and maximum altitude alert limits. The purpose of such entry may be to provide an alert to the pilot when either of the limits is exceeded. There are many options for the nature of the alert but in one embodiment, the display may be 'blanked' or the display of altitude 'dashed' when the limit is exceeded. In an exemplary embodiment, an annunciation 950 may be raised at the bottom of the screen such as is illustrated in FIG. 9*g*.

While a remote real-time UAV altitude and/or other flight data wireless system and method has been described with reference to various exemplary embodiments and component choices, it will be understood by those skilled in the art that various changes may be made as noted throughout the specification including substitution of various sensor components, methods for executing processor instructions and the like, including changes in function and arrangement of components or process steps without departing from the scope of the teachings herein. In addition, many modifications may be made to adapt the teachings herein to a particular situation without departing from the scope thereof. Therefore it is intended that the claims not be limited to the particular embodiments disclosed.

What is claimed is:

1. A wireless system for establishing a continuous real-time data link communicating flight data of a small UAV to a first smart device over a first wireless network, the first smart device having a display area for receiving operator input and for display of pages containing the flight data in accordance with a display data format, a nonvolatile memory for storage of software application code, a processor for executing the software application code, and a wireless communication module for connecting to the first wireless network, the system comprising;

an airborne wireless sensor system adapted to be removably attached to the UAV, the airborne wireless sensor system having, a sensor module configured for sensing UAV flight data, a communication module for establishing the first wireless data-link network and transmitting the sensed UAV flight data based on a wireless protocol to the first smart device, a non volatile memory for storing software instructions; and a processor module, configured to receive and process the UAV flight data from the sensor module, the processor module further configured to communicate the processed flight data to the communication module for transmission of the flight data over the first wireless network, the processor module further configured to execute the software instructions stored in the non-volatile memory, the execution of which cause the processor module to continuously receive and process the sensed UAV flight data from the sensor module and communicate the processed UAV flight data to the communication module, the communication module wirelessly transmitting the processed UAV flight data via the first wireless data-link network to the first smart device for real time visual display of the flight data on the smart device display page(s) in accordance with the display data format.

2. The system of claim 1, wherein the nonvolatile memory of the first smart device stores software application instructions (app) executable by the processor of the first smart device for:
providing one or more display data format selection GUI screens on the first smart device display;
receiving the operator's display data format selection input on the smart device display;
processing the operator's display data format selection thereby defining a selected display data format; and
communicating the operator's selected display data format to the airborne wireless sensor system via the first wireless network.

3. The system of claim 2 wherein the instructions stored in the airborne wireless stand-alone sensor system nonvolatile memory when executed by the processor further cause the airborne wireless sensor system to:
receive the operator's selected display data format from the first smart device transmitted over the first wireless network;
create data display pages in response to and consistent with the transmitted operator's selected display data format; and
transmit the data display pages to the first smart device via the first wireless network in accordance with the selected display data format.

4. The system of claim 2 wherein the step of providing display data format selection GUIs on a smart device display includes providing a choice between a limited default list of display parameters or an extended list of display data format options.

5. The system of claim 4 wherein the extended list of display parameters is chosen from the list of current altitude, maximum altitude, temperature, pressure, flight duration, graphical display, data units and altitude alert limits.

6. The system of claim 3 wherein the flight data include one or more of the following: current altitude, position, temperature, pressure, flight duration, maximum altitude and altitude alerts.

7. The system of claim 3 wherein the first smart device is a smart phone, smart watch, or tablet computer.

8. The system of claim 3 further comprising a second smart device and a second wireless network, the second smart device being wirelessly connected to the second wireless network for displaying flight data transmitted by the first smart device on the second wireless network.

9. The system of claim 3 wherein the first wireless communication network is a WiFi network or Bluetooth network and wherein the second wireless communication network is a WiFi network or Bluetooth network.

10. The system of claim 1 wherein the sensor module includes a barometric pressure sensor or a GPS receiver.

11. The system of claim 1 wherein the software application instructions (app) stored in the nonvolatile memory of the first smart device comprises a computer program adapted to run under the Android operating system.

12. A method of sensing and wirelessly communicating real-time UAV flight data for display from a stand-alone airborne wireless sensor system removably attached to the UAV, to a first wireless smart device, the first wireless smart device having a nonvolatile memory for storing computer instruction code, a processor for executing the computer instruction code, a display module for displaying pages containing flight data in accordance with a display data format and receiving operator input, and a wireless communication module, the airborne wireless sensing system having at least one sensor, a nonvolatile memory for storing computer instruction code, a processor for executing the computer instruction code, and a wireless communication module, the method comprising:
sensing UAV flight data with the at least one sensor of the airborne wireless sensor system;
the airborne wireless sensing system communication module sending the flight data to the first wireless smart device over the first wireless network;
the communications module of the wireless smart device receiving the UAV flight data transmitted by the airborne wireless sensor system over the first network; and
the smart device display module displaying the received UAV data on display page(s) in accordance with a display format in response to the data transmitted over the first wireless network.

13. The method of claim 12 further comprising the steps of:
removably securing the airborne wireless sensor system to the UAV prior to flight;
initializing the airborne wireless sensor system prior to flight by:
sensing an initial altitude reading when the UAV is at or near ground level thereby defining a zero_AGL_altitude_bias reading value;
saving the zero_AGL_altitude_bias value in airborne wireless sensor system non-volatile memory;
the processor of the airborne wireless sensor system determining UAV AGL altitude by correcting sensed altitude values with the zero_AGL_altitude_bias;
transmitting UAV AGL altitude to the first smart device over the first wireless network; and
displaying, on the first smart device display, the UAV AGL altitude.

14. The method of claim 13 wherein the nonvolatile memory of the first smart device stores software application instructions (app) executable by the processor of the first smart device, the method further comprising the steps of:
the processor of the first smart device executing the software application instructions causing one or more display data format selection screens to be displayed on the first smart device display;
receiving the operator's display data format selection inputs on the first smart device display;
first smart device wireless communication module transmitting the operator's display data format selections to the airborne wireless sensor system via the first wireless network;
the communication module of the airborne wireless sensor system receiving the operator's format selections transmitted via the first wireless network;
the airborne wireless sensor system processor processing the format selections transmitted from the first smart device, causing flight data display pages to be formatted responsive to the display data format selections made on the first smart device; and
transmitting UAV flight data in the selected display data format to the first smart device.

15. The method of claim 12 further comprising a second smart device and a second wireless network, the second smart device having a processor, a nonvolatile memory and a wireless communications module, the method further comprising the steps of:
connecting the second smart device to the second wireless network;
transmitting UAV flight data from the first smart device to the second smart device on the second wireless network;
the wireless communication module of the second smart device receiving the transmitted flight data; and
displaying flight data transmitted from the first smart device on the display of the second smart device.

16. The method of claim 12 wherein the smart device is one of a smart phone, laptop, tablet, or smart watch.

17. The method of claim 15 wherein the first wireless communication network is a Wi-Fi or Bluetooth network, wherein the second smart device is a smartwatch, and wherein the second wireless network is a Wi-Fi or Bluetooth network.

18. The method of claim 12 further comprising the step of post-flight downloading of the flight data to the smart device.

19. The method of claim 12 wherein the step of correcting the sensed altitude values to obtain UAV AGL altitude comprises subtracting the zero_AGL_bias_altitude from subsequent sensed altitude values.

20. A computer code implemented process of sensing and wirelessly communicating real-time UAV flight data for display from a stand-alone airborne wireless sensing system removably attached to a UAV transmitted over a wireless data network to a first wireless smart device, the first wireless smart device having a nonvolatile memory for storing a first computer instruction code, a processor for executing the first computer instruction code, a display module for displaying data and receiving operator input, and a wireless communication module for connecting to the first wireless network, the airborne wireless sensing system having at least one sensor, a nonvolatile memory for storing a second computer instruction code, a processor for executing the second computer instruction code, and a wireless communication module for connecting to the first wireless network, the method comprising:
executing smart device first computer instruction code to:
present one or more Graphical User Interface (GUI) screens to the operator on the smart device display, the GUI screens presenting the operator with one or more display data format selection options, the selection of which control the form and content of the data displayed on the smart device display thereby defining a display data format,
receive and process the operator selection inputs on the smart device display, and
communicate, using the first smart device communication module, the operator display data format selection inputs to the airborne wireless sensing system over the first wireless network;
executing airborne wireless sensor system second computer instruction code to:
receive, using the airborne wireless sensor system communication module, the operator display data format selection inputs from the smart device transmitted over the first wireless network, and
process the operator display data format selection inputs thereby determining the form and content of the display data pages in accordance with the operator selections;
submitting a request from the first wireless smart device to the airborne wireless sensor system for a data page;
servicing the page request from the first wireless smart device by transmitting a data page from the airborne wireless sensor system to the first wireless smart device in response to the request from the first wireless smart device and in accordance with the display data format selections made by the operator on the first wireless smart device; and
displaying, on the first wireless smart device display, the flight data transmitted by the airborne wireless sensor system on the first wireless network, in accordance with the selected display data format.

* * * * *